(12) United States Patent
Fitzgerald

(10) Patent No.: US 12,292,950 B2
(45) Date of Patent: May 6, 2025

(54) COMPUTER CHALLENGE SYSTEMS BASED ON SOUND RECOGNITION

(71) Applicant: ARKOSE LABS HOLDINGS, INC., San Mateo, CA (US)

(72) Inventor: Gabrielle Fitzgerald, Fortitude Valley (AU)

(73) Assignee: ARKOSE LABS HOLDINGS, INC., San Mateo, CA (US)

( * ) Notice: Subject to any disclaimer, the term of this patent is extended or adjusted under 35 U.S.C. 154(b) by 238 days.

(21) Appl. No.: 18/184,146

(22) Filed: Mar. 15, 2023

(65) Prior Publication Data
US 2023/0306093 A1 Sep. 28, 2023

Related U.S. Application Data

(60) Provisional application No. 63/323,757, filed on Mar. 25, 2022.

(51) Int. Cl.
*G06F 21/00* (2013.01)
*G06F 21/31* (2013.01)

(52) U.S. Cl.
CPC ...... *G06F 21/31* (2013.01); *G06F 2221/2103* (2013.01); *G06F 2221/2133* (2013.01)

(58) Field of Classification Search
None
See application file for complete search history.

(56) References Cited

U.S. PATENT DOCUMENTS

| | | | | |
|---|---|---|---|---|
| 9,985,943 | B1* | 5/2018 | Reading | H04L 63/08 |
| 10,587,594 | B1* | 3/2020 | McClintock | H04L 63/08 |
| 10,885,091 | B1* | 1/2021 | Meng | G06F 16/24578 |
| 10,991,373 | B1* | 4/2021 | Wang | G06F 21/52 |
| 11,429,700 | B2* | 8/2022 | Inoue | G06F 21/32 |
| 11,544,370 | B1* | 1/2023 | Pickering | G06F 21/6245 |
| 11,816,194 | B2* | 11/2023 | Boule | G06F 21/31 |

(Continued)

OTHER PUBLICATIONS

Nene, Manisha J.; Mohapatra, RK. Voiceproof: Speaker Verification with Captcha A Novel Biometric Access Control Mechanism. 2022 International Conference for Advancement in Technology (ICONAT). https://ieeexplore.ieee.org/stamp/stamp.jsp?tp=&arnumber=9726035 (Year: 2022).*

(Continued)

*Primary Examiner* — Jeremiah L Avery
(74) *Attorney, Agent, or Firm* — Womble Bond Dickinson (US) LLP

(57) ABSTRACT

A method includes sending a challenge data structure to a user computer system. The challenge data structure defines a challenge user interface to be presented to a user of the user computer system. The challenge user interface includes a playback control area for playing an audio clip comprising a plurality of sounds. The challenge user interface prompts the user to select two or more answers corresponding to two or more sounds from a multiple choice answer area of the challenge user interface. The method includes obtaining a user input to the challenge user interface that represents a selection of at least one image from the plurality of images, and providing access to a computer resource for the user computer system based on whether the at least one image is consistent with the correct image.

20 Claims, 13 Drawing Sheets

(56) References Cited

U.S. PATENT DOCUMENTS

| | | | |
|---|---|---|---|
| 12,147,588 B2* | 11/2024 | Cui | G06F 21/78 |
| 2012/0144455 A1* | 6/2012 | Lazar | G06F 21/31 |
| | | | 726/4 |
| 2013/0031641 A1* | 1/2013 | Fisk | G06F 21/31 |
| | | | 726/28 |
| 2017/0068659 A1* | 3/2017 | Rothwell | G06F 16/90332 |
| 2019/0012445 A1* | 1/2019 | Lesso | G10L 17/24 |
| 2019/0095170 A1* | 3/2019 | Lang | G06F 21/16 |
| 2019/0286796 A1* | 9/2019 | Schuler | H04W 12/60 |
| 2019/0318069 A1* | 10/2019 | Mitic | H04W 12/04 |
| 2020/0067916 A1* | 2/2020 | Spates, IV | H04L 12/282 |
| 2021/0074305 A1* | 3/2021 | Gopala | G10L 25/30 |
| 2021/0119794 A1* | 4/2021 | Shpurov | G06F 21/602 |
| 2021/0204116 A1* | 7/2021 | Naujok | H04L 67/01 |
| 2021/0209606 A1* | 7/2021 | Herlands | G06Q 20/4016 |
| 2021/0279700 A1* | 9/2021 | Simpson | H04W 12/65 |
| 2022/0148057 A1* | 5/2022 | Venkatakrishnan | G06Q 30/06 |
| 2024/0012899 A1* | 1/2024 | Mao | G06F 21/6218 |

OTHER PUBLICATIONS

Banday, M. Tariq; Sheikh, Shafiya Afzal. Service framework for dynamic multilingual CAPTCHA challenges: IN-CAPTCHA. 2014 International Conference on Advances in Electronics Computers and Communications. https://ieeexplore.ieee.org/stamp/stamp.jsp?tp=&arnumber=7002384 (Year: 2014).*

Meutzner, Hendrik; Kolossa, Dorothea. A non-speech audio CAPTCHA based on acoustic event detection and classification. 2016 24th European Signal Processing Conference (EUSIPCO). https://ieeexplore.ieee.org/stamp/stamp.jsp?tp=&arnumber=7760649 (Year: 2016).*

Shekhar, Heemany et al. Exploring Adversaries to Defend Audio CAPTCHA. 2019 18th IEEE International Conference on Machine Learning And Applications (ICMLA). https://ieeexplore.ieee.org/stamp/stamp.jsp?tp=&arnumber=8999236 (Year: 2019).*

* cited by examiner

COMPUTER CHALLENGE SYSTEMS BASED ON SOUND RECOGNITION

CROSS-REFERENCE TO RELATED APPLICATION

This application claims the benefit of U.S. Provisional Application No. 63/323,757, filed on Mar. 25, 2022, the entire contents of which are hereby incorporated by reference herein.

FIELD

The present disclosure generally relates to controlling access to computer resources to limit automated and unintended accessing of the computer resources. The disclosure relates more particularly to apparatus and techniques for presenting challenges to users that utilize sounds.

BACKGROUND

Computer resources are often created for access by humans and the creators may seek to reduce or block access to those computer resources when the access is by unintended users such as an automated process that is attempting access or by unintended human users who may be attempting to access the computer resources in ways unintended or undesired by their creators. For example, a web server serving web pages related to a topic may be set up for human users to browse a few pages but not set up for an automated process to attempt to browse and collect all available pages or for persons employed to scrape all of the data. As another example, a ticket seller may wish to sell tickets to an event online, while precluding unauthorized resellers from using an automated process to scrape data off the ticket seller's website and buy up large quantities of tickets.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments without departing from the spirit and scope of the described embodiments.

DETAILED DESCRIPTION

Figure 1:
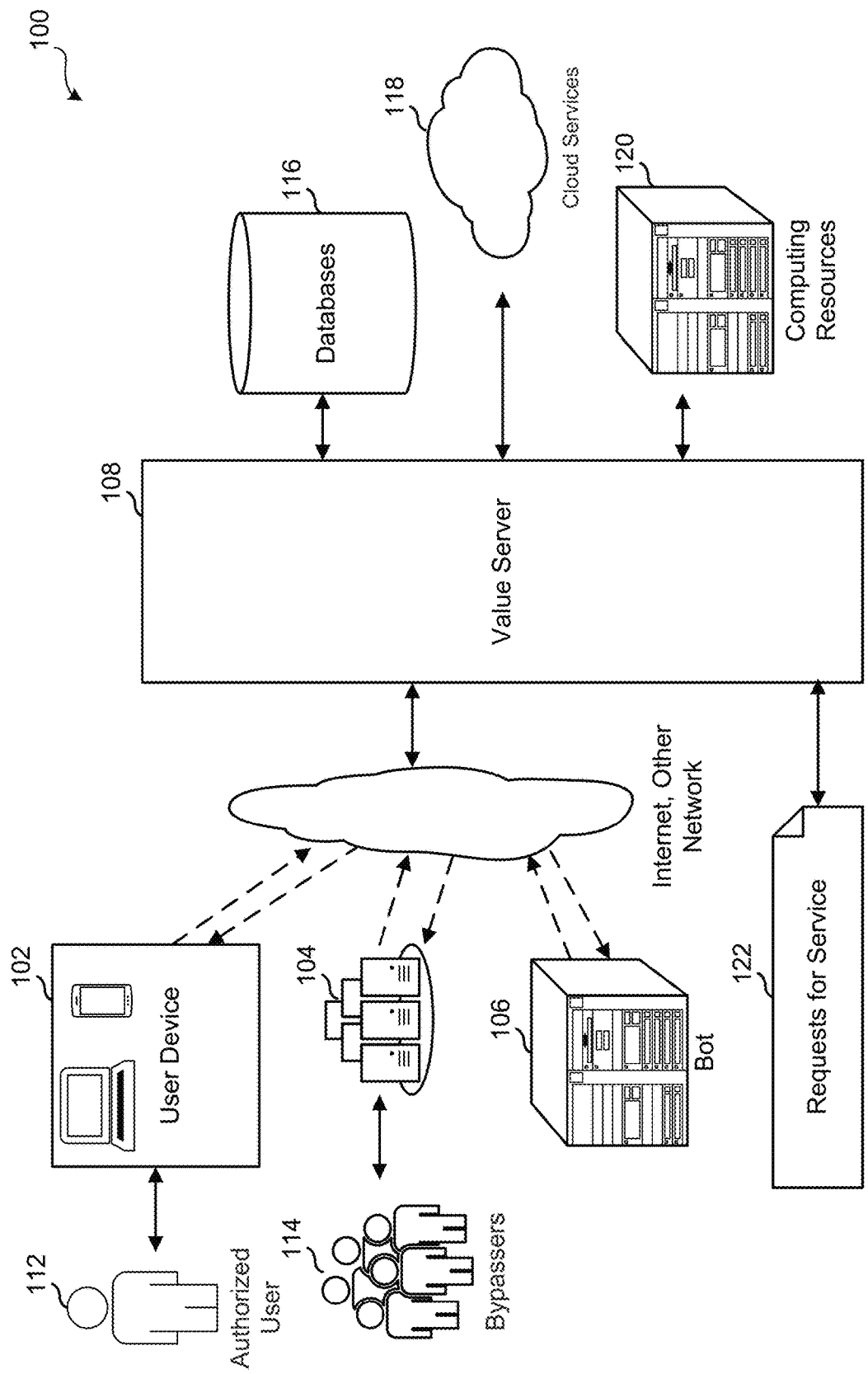
FIG. 1 is a block diagram of a network environment wherein an authentication challenge system may be deployed, according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Unauthorized access and/or unwanted access to computer resources may be used to cause damage, such as highly-repetitive access to a computer resource in order to block others from accessing it, causing servers to crash, flooding comment sections with messages, creating a large number of fictitious identities in order to send spam or bypass limits, skewing results of a vote or poll, entering a contest many times, brute force guessing of passwords or decryption keys, or the like. In some cases, systems may perform user authentication, such as presenting authentication challenges in order to distinguish authorized users of a computing asset from unauthorized users. Unauthorized users may include unauthorized human users, users attempting to bypass controls ("bypassers"), and/or unauthorized automated agents.

A provider of computer resources may wish to determine whether a given user accessing those computer resources is a legitimate human user, an automated process, or a bypasser, given that access to the resources would be computer-mediated in each case. For example, companies and other organizations may create materials and make them available online, sometimes via intermediaries that charge per view. These organizations may spend huge sums, or make significant efforts, in creating and disseminating these materials, but wish to ensure that real, human consumers in their target audience view particular materials, as automated agents can generate false impressions that someone in the target audience has viewed the materials when in fact no real human in the target audience has done so. In some cases, there may be humans accessing that content, but not be in the target audience, such as someone deployed to access the content without viewing the materials. Companies and other organizations lose the effect of the money they pay by spending for these false impressions by unintended users, whether human or not.

Some software and/or hardware solutions have been proposed to filter access so that access is limited to human users. Authentication programs are commonly used to ensure that information entered into a computer, such as via a web site, is entered by a human user of a computing device rather than by an automated program, such as a computer-executed "bot" or "agent." One example of such an authentication program presents a string of random characters to a user and ask the user to enter the presented characters. If the user enters the characters correctly, the user is allowed to proceed to the computer resource that is protected by the authentication program.

However, agents have adapted to include character recognition in order to circumvent such authentication programs. In response, authentication programs such as CAPTCHA ("Completely Automated Public Turing test to tell Computers and Humans Apart") programs have been developed. Some text-based CAPTCHA embodiments disguise text characters, for example by adding background noise, or randomly positioning the characters on the screen, rather than in pre-provided rows. Although such programs are somewhat successful at preventing agents from accessing a computer, it also can be difficult for human users to read such disguised characters. As such, text-based CAPTCHA authentication programs often can be frustrating and tedious to use.

In some cases, visually impaired users (e.g., near-sighted or far-sighted, without access to glasses or contacts at the time of verification) may also need to pass CAPTCHAs to access internet resources. The current visual CAPTCHAs would be limited. Sometimes, the text based audio CAPTCHAs may not help if input text is read back by screen readers and overlaps with a puzzle audio. The present disclosure provides improved user experiences, such as without text or visual input, as well as distinctly separating the puzzle audio from screen reader audio. The present disclosure provides a large variety of options, which prevents brute forcing by bots (e.g., machine, artificial intelligence, robots, computer automation, etc.), without the need of text or visual input.

Techniques described and suggested herein solve these and other problems by presenting computer authentication challenges and processing responses to computer authentication challenges. An authentication challenge may be issued and managed by an authentication program or system used to ensure that information entered into a computer, such as via a web site, is entered by a human user of a computing device rather than by an automated program commonly known as a bot or an agent. Agents are commonly used by computer hackers in order to gain illicit entry to web sites, or to cause malicious damage, for example by creating a large amount of data in order to cause a computer system to crash, by creating a large number of fictitious membership accounts in order to send spam, by skewing results of a vote or poll, by entering a contest many times, or by guessing a password or decryption key through a brute force method, etc. Thus, it can be desirable to detect such activities to block or limit them.

Authentication programs may be able to be bypassed by somewhat sophisticated agents that can determine the requested answer despite the disguise. As such, character-based CAPTCHA authentication programs often fail to prevent automated abuse of the protected computer system.

Another example of a user authentication program may present a grid of photographs to a user and prompt the user to select one or more photographs that meet a stated criterion (e.g., "From the displayed pictures, select those that contain construction vehicles"). Although such programs can be successful at preventing some agents from accessing a computer, it also can be difficult for human users to decide whether the instruction applies or does not apply to photographs with ambiguous contents, such as whether a consumer-grade sports utility vehicle should be regarded as a construction vehicle. As a result, photo-based CAPTCHA authentication programs often can be frustrating and tedious to use for authorized users.

Such authentication programs may be able to be bypassed by somewhat sophisticated agents that can automatically recognize the contents of photographs and so such photo-based CAPTCHA authentication programs that rely solely on image recognition can fail to prevent automated abuse of the protected computer system.

An authentication system that can be bypassed by a merely somewhat sophisticated agent can motivate computer hackers to invest a small amount of labor to create such an agent, provided that the reward for bypassing the authentication system is greater than the investment that must be made to create the agent. On the other hand, an authentication system that can only be bypassed by a highly sophisticated agent may discourage computer hackers from investing the large amount of labor needed to create such an agent, as the reward for bypassing the authentication system may be smaller than the investment that must be made to create the agent.

Authentication system design therefore often takes into account these considerations, to provide a method and system for user authentication that is both easy for authorized users to pass without frustration and tedium and very difficult for unauthorized users, or at least create enough of a cost for unauthorized users to discourage investment of labor into creating a work-around.

In an example hardware system according to some embodiments of the present disclosure, an authentication challenge system may be coupled with a value server that serves or manages some protected computer resource that can be accessed by user devices and is to be protected by the authentication challenge system against unauthorized user device access while permitting authorized user devices to access the value server, to some level of protection. The level of protection may not be absolute in that some authorized user devices may be blocked from access and some unauthorized user devices may obtain access.

FIG. 1 is a block diagram of a network environment 100 wherein an authentication challenge system may be deployed, according to an embodiment. In the example shown in FIG. 1, a user device 102, a set of bypasser devices 104, and a bot 106 may be attempting to obtain services from a value server 108. It is assumed in this example that a user 112 operating user device 102 is an authorized user to whom an operator of value server 108 is willing to provide services, whereas the operator is not willing to provide services to bypassers 114 using the set of bypasser devices 104 or to bot 106. The particular services provided are not necessarily relevant to processes of trying to allow authorized access and trying to prevent unauthorized access, but examples are illustrated, including databases 116, cloud services 118, and computing resources 120. Those services may include serving webpages and interactions with users. Various devices may send requests 122 for services and receive in response the requested services, receive a challenge (possibly followed by the requested services if the challenge is met), or receive a rejection message. As explained herein, the challenge could be a process that is designed to filter out requesters based on an ability to meet a challenge, where meeting the challenge requires some real-world experience and/or knowledge not easily emulated by a computer—thus potentially blocking bot 106 from accessing services—and that is potentially time-consuming for bypassers 114 to work on—thus potentially making the requests economically infeasible for a hired set of bypassers 114 or other bypassers 114 who may not be interested in the requested services as much as bypassing controls for others or for various reasons, all while limiting a burden on an authorized legitimate user (e.g., authorized user 112) of the services.

Figure 2:
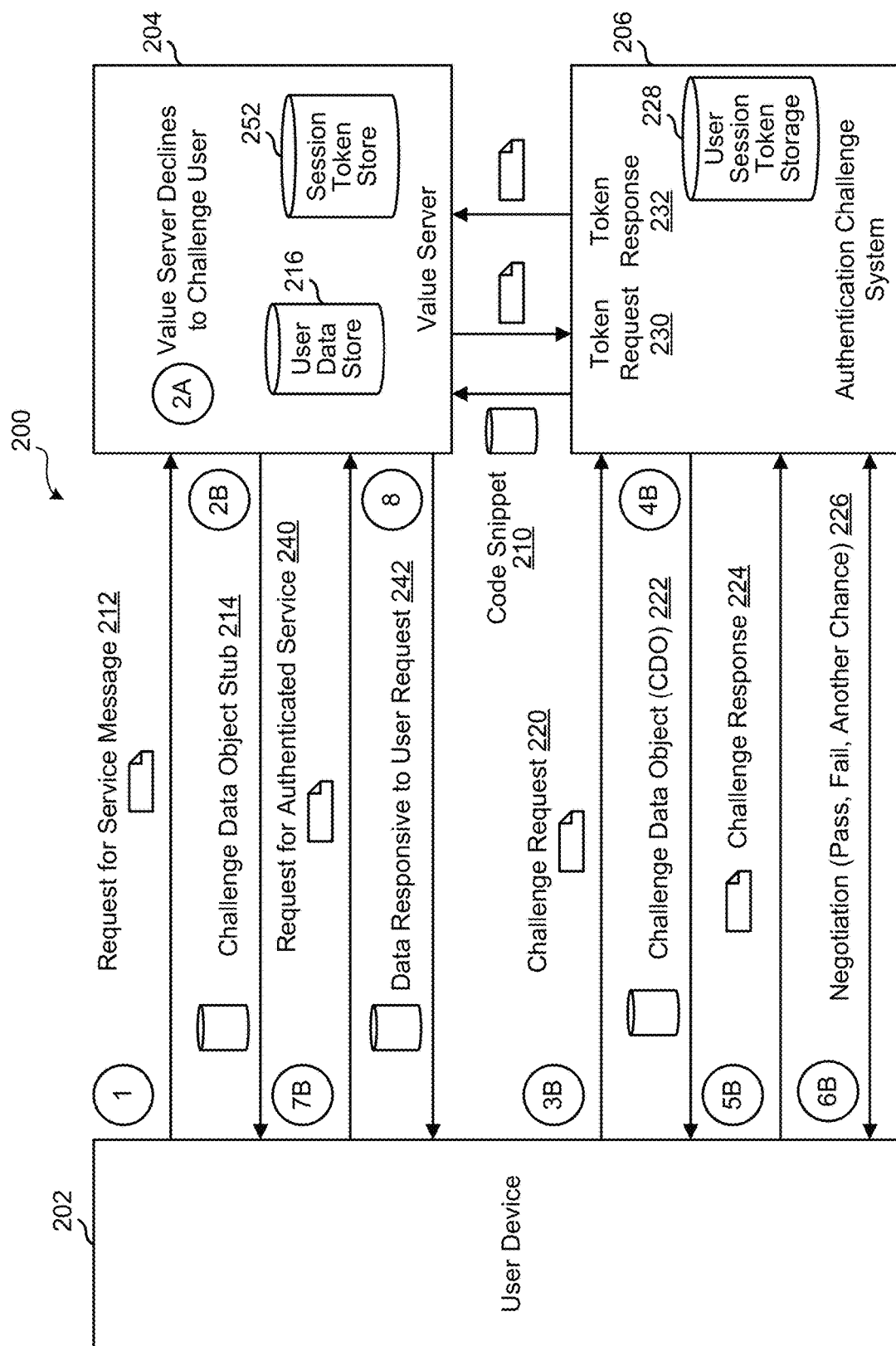
FIG. 2 is a block diagram of an authentication challenge system and exemplary components, according to an embodiment of the present disclosure.

FIG. 2 is a block diagram of an authentication challenge system 200 and example components, according to an embodiment. Messages and data objects that are passed among components are shown in greater detail than in FIG. 1, but user device 202 in FIG. 2 may correspond to user device 102 in FIG. 1, a bypasser device 104 of FIG. 1, or bot 106 of FIG. 1, while value server 204 may correspond to value server 108 of FIG. 1. That said, those like components may be different or differently configured.

Also illustrated in FIG. 2 are indicators of a typical order of operations of communications among user device 202, value server 204, and an authentication challenge system 206. It should be noted that other orders of operations may be taken, and some operations may be omitted or added. In a precursor operation, authentication challenge system 206 may supply value server 204 a code snippet 210 usable by value server 204 for handling challenges.

In an operational process illustrated, user device 202 may send a "request for service" message 212 to value server 204 (referenced as communication "1"). Value server 204 may then determine whether a challenge is to be provided and either declines to challenge the user device 202 making the request (communication 2A) or to challenge the user device 202 making the request. For example, where user device 202 is already logged in and authenticated to value server 204, value server 204 may have enough information to be able to skip a challenge process and may respond to the user request immediately without requiring further authentication.

In the case where value server 204 decides to challenge, value server 204 may send (communication 2B) a challenge data object (CDO) stub 214 to user device 202. CDO stub 214 may have been supplied as part of code snippet 210 from the authentication challenge system 206. In some embodiments, what is sent is an entire CDO as explained herein elsewhere. In some embodiments, as explained herein elsewhere, CDO stub 214 may include information about the user or the request and such information may be encrypted or signed such that user device 202 cannot easily alter the information without that alteration being detected. Such information may include details about the user that are known to value server 204, such as an IP address associated with the request, country of origin of the request, past history of the user, if known, etc. This data may be stored as user data in user data store 216.

CDO stub 214 may be code, a web page, or some combination that is designed to have user device 202 issue a challenge request 220 (communication 3B). For example, CDO stub 214 may be code that generates and transmits challenge request 220, or it may be a web page that is displayed by user device 202, perhaps with a message like "Click on this line to get validated before you can access the requested resource" with the link directed to authentication challenge system 206. In response to receiving challenge request 220, authentication challenge system 206 may respond (communication 4B) with a challenge data object (CDO) 222, example structures of which are detailed herein elsewhere.

CDO 222 may include code, a web page, or some combination that can be processed by user device 202 to present a challenge to a user of user device 202. Authentication challenge system 206 may then await a response from user device 202, typically while handling other activities asynchronously. User device 202 may send a challenge response 224 (communication 5B) to authentication challenge system 206. The challenge response 224 may be a result of input provided by the user of the user device 202. For example, the challenge response 224 may be generated in response to interaction of one or more input devices (e.g., a keyboard, mouse, touch screen, speaker, etc.) of the user device 202. As explained elsewhere herein, authentication challenge system 206 can process challenge response 224 in light of CDO 222 and evaluate whether the user satisfied the challenge represented in CDO 222 and then engage in a negotiation 226 (explained in more detail below) with user device 202 (communication 6B).

If authentication challenge system 206 determines that the challenge was met, communication 6B (negotiation 226) can be in the form of a "pass" message, while if authentication challenge system 206 determines that the challenge was not met, communication 6B can be in the form of a "fail" message. Another alternative is a message indicating that the user has additional chances to try again, perhaps with a new challenge included with such alternative message (e.g., "Your answer did not seem right, given the challenge. Click here to try again.").

Challenge response 224 and/or challenge request 220 may include information from value server 204 that passed through user device 202, perhaps in a secured form. That information may allow authentication challenge system 206 to identify the user and a user session for which the challenge is to apply. Authentication challenge system 206 may then store a user session token in user session token storage 228 indicating the results of the challenge. Then, when value server 204 sends a token request 230 identifying the user and user session, authentication challenge system 206 can reply with a token response 232 indicating whether the user met the challenge, and possibly also that the user did not meet the challenge or that the user never requested a challenge or responded to one.

The CDO stub 214 may be such that the user device 202 may send a request for authenticated service to value server 204, such as a webpage portion that instructs "Once you are authenticated, click here to proceed to your desired content" or the like in the form of a request for authenticated service 240 (communication 7B), which can signal to value server 204 that the user is asserting that they have completed the challenge. Of course, value server 204 need not trust the assertion, but may then be aware that authentication challenge system 206 may indicate that the challenge was indeed correctly responded to. Request for authenticated service 240 may be sent by user device 202 without user interaction after user device 202 receives a success message related to negotiation 226.

At this point, value server 204 can send token request 230 to authentication challenge system 206 and receive token response 232 from authentication challenge system 206. In some embodiments, value server 204 may wait a predetermined time period and send token request 230 without waiting for a signal from user device 202. In such embodiments, user device 202 may not send a request for authenticated service after its initial request. In some embodiments, authentication challenge system 206 may delay sending token response 232 if authentication challenge system 206 is involved in processing a challenge with user device 202 such as when the user has not yet requested a challenge or has failed a challenge but is given another chance, so that authentication challenge system 206 can ultimately send a token response indicating a successful response to the challenge.

In any case, value server 204 may respond with data 242 responsive to the user request (communication 8). If authentication challenge system 206 can independently determine that user device 202 is operated by an authorized user, then authentication challenge system 206 may store a user session token in user session token storage 228 indicating that a challenge was met. In that case, the timing of receiving token request 230 may be less important, as authentication challenge system 206 would be ready to respond at any time.

A number of examples of challenges are described in detail herein, including possible user responses that could be conveyed in challenge response messages. While just one challenge process was described in detail, it should be understood that value server 204 may process many requests in parallel and interact with more than one authentication challenge system and authentication challenge system 206 may process requests from many user devices in parallel and interact with many value servers.

Challenge response message 224 may include, in addition to an indication of the user's response to the challenge, a challenge identifier that identifies CDO 222 that was sent to challenge the user, in which case authentication challenge system 206 can easily match up the response with the challenge to determine if the response is consistent with an answer key for the specific challenge given.

Once value server 204 receives token response 232 and token response 232 indicates that the user is authenticated and not an undesired user, value server 204 can determine its next operation. Value server 204 may also store token response 232 into a session token store 252 usable for handling subsequent requests from the user. At this point in the process, whether value server 204 determined that no challenge was to be provided (communication 2A) or determined a challenge was to be provided and has a token response indicating that the challenge was met, value server 204 can respond to the request of the user device 202.

In some embodiments of the process, the processing may be done in a time period similar to a time period normally required for processing service requests. In other words, it could appear to the user that the processing is quick, except for the time the user takes to mentally process and respond to the challenge presented. As explained herein below, CDOs may be created in advance for quick deployment.

In the example shown in FIG. 2, a value server is configured to handle some of the authentication processes. Another variation could be used where the value server does not handle any authentication and may not even be aware it is happening. This may be useful for securing legacy systems.

Figure 3:
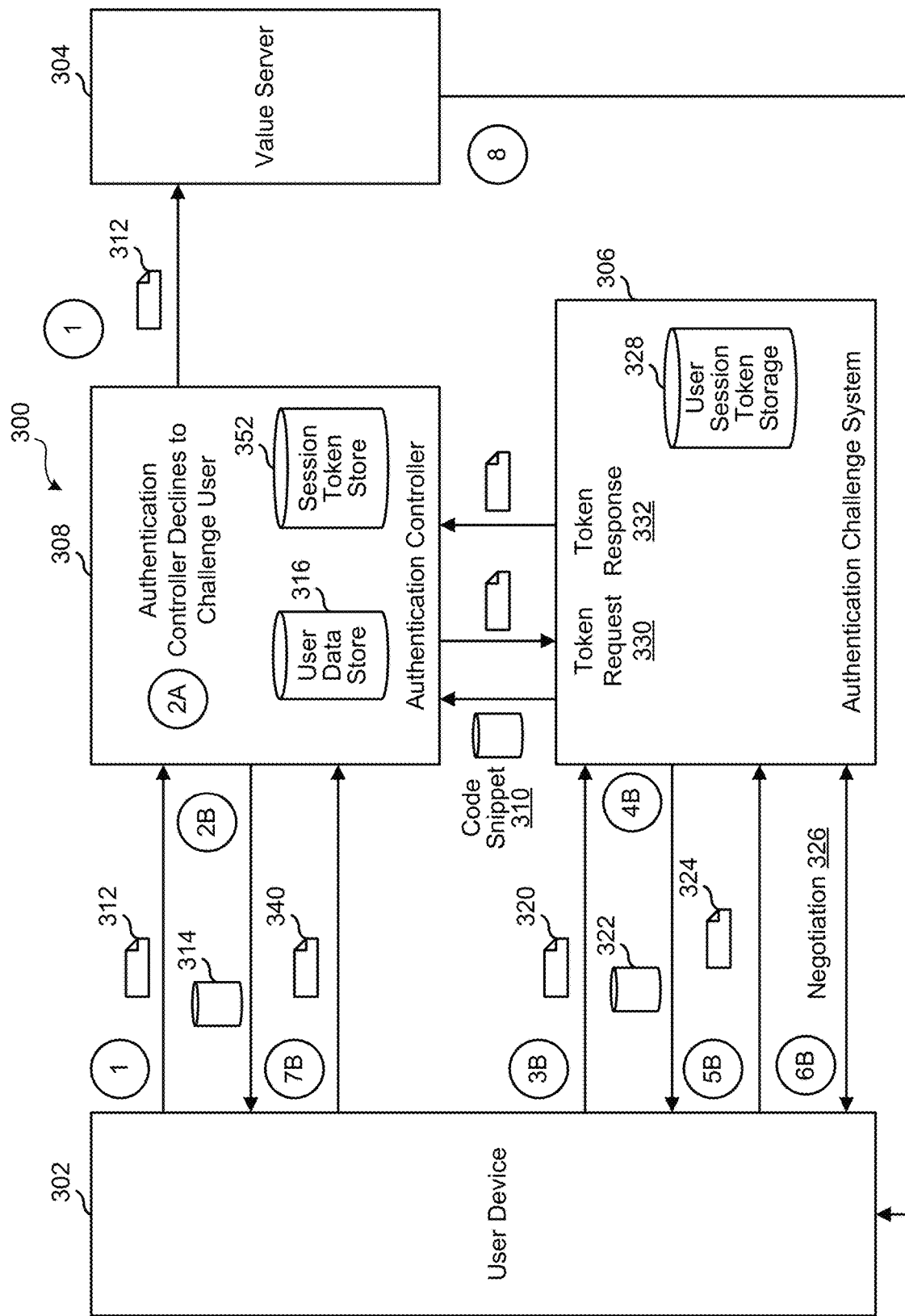
FIG. 3 is a block diagram of a system in which a value server is secured using an authentication controller for access control, in accordance with some embodiments of the present disclosure.

FIG. 3 is a block diagram of a system 300 in which a value server 304 is secured using an authentication controller for access control such that requests from a user device 302 can be limited, mostly, to requests from authorized users. As shown there, an authentication challenge system 306 and an authentication controller 308 together operate to control access of user device 302 to value server 304. As illustrated, a communication 1 comprises a request for services 312 from user device 302 to authentication controller 308 and may be a request similar to other requests described herein.

Also illustrated in FIG. 3 are indicators of a typical order of operations of communications among user device 302, value server 304, authentication challenge system 306, and authentication controller 308. It should be noted that other orders of operations may be taken, and some operations may be omitted or added. In a precursor operation, authentication challenge system 306 may supply authentication controller 308 a code snippet 310 usable by authentication controller 308 for handling challenges. In some embodiments, authentication challenge system 306 and authentication controller 308 are integrated.

In an operational process illustrated, user device 302 sends a "request for service" message 312 towards value server 304 (communication 1), which is either intercepted by authentication controller 308 or passed through to value server 304. As with value server 204 of FIG. 2, authentication controller 308 determines whether a challenge is to be provided and either declines to challenge the user device 302 making the request (communication 2A) or to challenge the user device 302 making the request, possibly relying on user data in a user data store 316.

In the case where authentication controller 308 decides to challenge, authentication controller 308 sends a challenge data object (CDO) stub 314 to user device 302 (communication 2B). CDO stub 314 may be code, a web page, or some combination that is designed to have user device 302 issue a challenge request 320 (communication 3B) to authentication challenge system 306, similar to CDO stub 214 shown in FIG. 2. In response to receiving challenge request 320, authentication challenge system 306 may respond (communication 4B) with a challenge data object (CDO) 322, similar to CDO 222 of FIG. 2. Authentication challenge system 306 may then await a response from user device 302, typically while handling other activities asynchronously. User device 302 may send a challenge response 324 (communication 5B) to authentication challenge system 306. The challenge response 324 may be a result of input provided by the user of the user device 302. For example, the challenge response 324 may be generated in response to interaction of one or more input devices (e.g., a keyboard, mouse, touch screen, speaker, etc.) of the user device 302. Authentication challenge system 306 can process challenge response 324 in light of CDO 322 and evaluate whether the user satisfied the challenge represented in CDO 322 and then engage in a negotiation 326 with user device 302 (communication 6B).

If authentication challenge system 306 determines that the challenge was met, communication 6B (negotiation 326) can be in the form of a "pass" message, while if authentication challenge system 306 determines that the challenge was not met, communication 6B can be in the form of a "fail" message. Another alternative is a message indicating that the user has additional chances to try again, perhaps with a new challenge included with such alternative message.

Challenge response 324 and/or challenge request 320 may include information from authentication controller 308 that passed through user device 302, perhaps in a secured form. That information may allow authentication challenge system 306 to identify the user and a user session for which the challenge is to apply. Authentication challenge system 306 may then store a user session token in user session token storage 328 indicating the results of the challenge. Then, when authentication controller 308 sends a token request 330 identifying the user and user session, authentication challenge system 306 can reply with a token response 332 indicating whether the user met the challenge, and possibly also that the user did not meet the challenge or that the user never requested a challenge or responded to one. Authentication challenge system 306 and/or authentication controller 308 may have logic to delay token request 330 and/or token response 332 to give the user time to complete a challenge but can send token request 330 after receiving a request for authenticated service 340 (communication 7B). For example, authentication challenge system 306 may wait ten seconds after receiving token request 330 before responding with token response 332 if the user has not yet requested a challenge or has failed a challenge but is given another chance. Authentication controller 308 may have logic to delay sending token request 330 to give the user some time to complete a challenge process with authentication challenge system 306.

If authentication challenge system 306 can independently determine that user device 302 is operated by an authorized user, then authentication challenge system 306 may store a user session token in user session token storage 328 indicating that a challenge was met. While just one challenge process was described in detail, it should be understood that authentication controller 308 may process many requests in parallel and interact with more than one authentication challenge system and more than one value server and authentication challenge system 306 may process requests from many user devices in parallel and interact with many authentication controllers.

Challenge response 324 may include, in addition to an indication of the user's response to the challenge, a challenge identifier that identifies CDO 322 that was sent to challenge the user, in which case authentication challenge system 306 can easily match up the response with the challenge to determine if the response is consistent with an answer key for the specific challenge given.

Once authentication controller 308 receives token response 332 and token response 332 indicates that the user is authenticated and not an undesired access, authentication controller 308 can determine its next operation. Authentication controller 308 may also store token response 332 into a session token store 352 usable for handling subsequent requests from the user. At this point in the process, whether authentication controller 308 determined that no challenge was to be provided (2A) or determined a challenge was to be provided and has a token response indicating that the challenge was met, authentication controller 308 can forward the user's request to value server 304, which may respond (communication 8) to user device 302 as if no authentication took place.

As with embodiments where a value server handles some of the tasks, all of the processing may be done in a time period similar to a time period normally required for processing service requests and CDOs may be created in advance for quick deployment. In some of these operations and examples, the communication and/or message or data sent corresponds to what is depicted in FIG. 3 and described herein.

An authentication challenge system may have multiple components, such as a decision server that decides whether a user device should be challenged, a response processor that evaluates user responses to challenges, a challenge server that outputs and manages challenges, a challenge creation system usable for creating challenges and classes of challenges, and an authentication access system that controls whether the user device obtains access to the value server. Some of these components may be integrated into a single system, such as where the challenge processor and decision server are integrated, the challenge processor and response processor are integrated, or all three are integrated.

Figure 4:
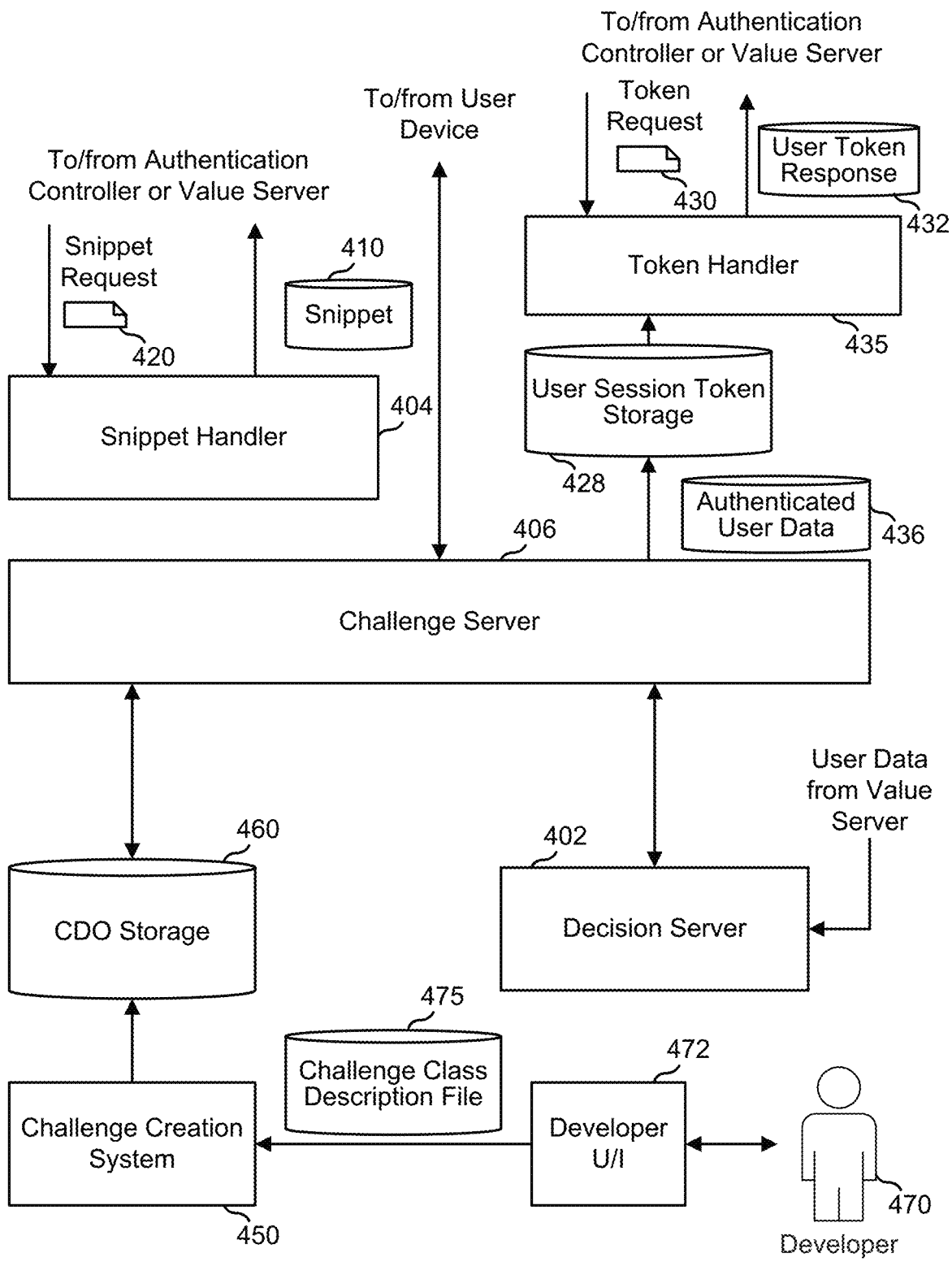
FIG. 4 is a block diagram of an authentication challenge system in an embodiment of the present disclosure.

FIG. 4 is a block diagram of an authentication challenge system in an embodiment. As illustrated there, an authentication challenge system may include a snippet handler 404 that receives a snippet request 420 from a value server or an authentication controller and responds with a code snippet 410, such as code snippets 210 and 310 (in FIGS. 2-3). A challenge server 406 may receive and respond to messages from a user device (as detailed in FIG. 5). A token handler 435 may receive token requests 430 from a value server or an authentication controller and respond with a token response 432, such as token requests 230, 330 and token responses 232, 332 in FIGS. 2-3, in response to data read from a user session token storage 428. The challenge server 406 may provide user session data 436 for the user session token storage 428.

As shown, the challenge server 406 may interact with a decision server 402 that decides whether to challenge a user, perhaps based in part on user data received from a value server or an authentication controller. The challenge server 406 may interact with a CDO storage 460 to retrieve CDOs to provide to user devices. The CDO storage 460 may be pre-populated with CDOs for quick response. Those CDOs may be created in advance by a challenge creation system 450. A developer 470 may develop classes of challenges using a developer user interface 472 to create challenge class description files 475 that the challenge creation system 450 can use to generate large numbers of distinct CDOs. By being able to create large numbers of distinct CDOs from one challenge class description file 475, the labor effort per CDO can be reduced, allowing for many more distinct challenges (which may be more work for bypassers to try and work around) without requiring much more work on the part of developers 470.

Figure 5:
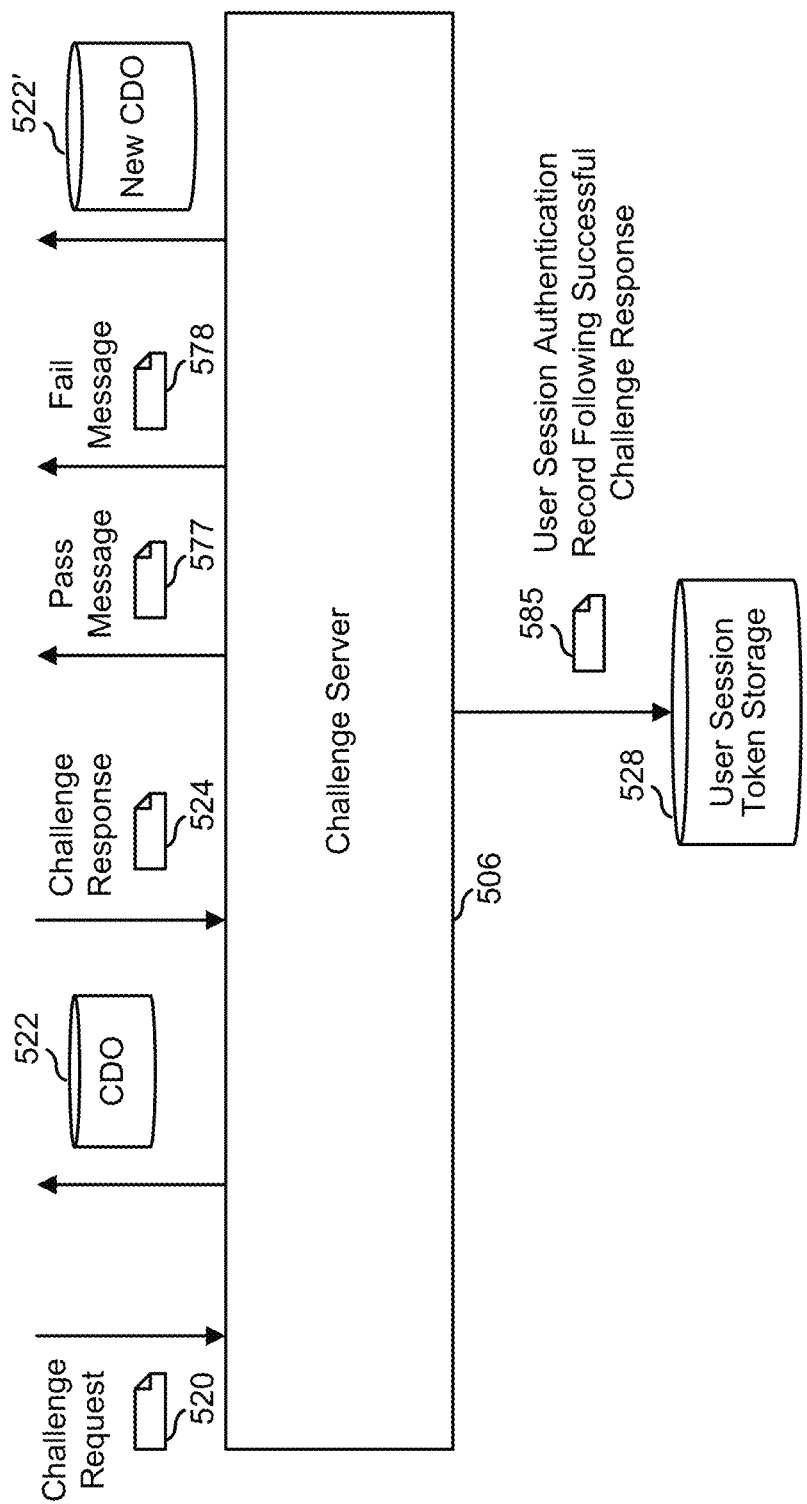
FIG. 5 is a block diagram showing user interactions with the challenge server, in an embodiment of the present disclosure.

FIG. 5 is a block diagram showing user interactions with the challenge server 506, in an embodiment. The challenge server 506 may be similar to that of the challenge server 406 of FIG. 4. As shown in FIG. 5, a user device (e.g., user device 202 or 302 of FIGS. 2 and 3) may send a challenge request 520 to the challenge server 506, which may respond with a CDO 522. The user device may send a challenge response 524, perhaps formatted so that the challenge server 506 can determine the corresponding CDO 522 or at least whether the challenge response 524 is a valid response. The challenge server 506 may then send the user device a "pass" message 577, a "fail" message 578, or a new CDO 522' giving the user a chance to respond to a new challenge. Where the user device provides a valid and correct challenge response 524, the challenge server 506 may then store a user session authentication record 585 into a user session token storage 528.

Figure 6:
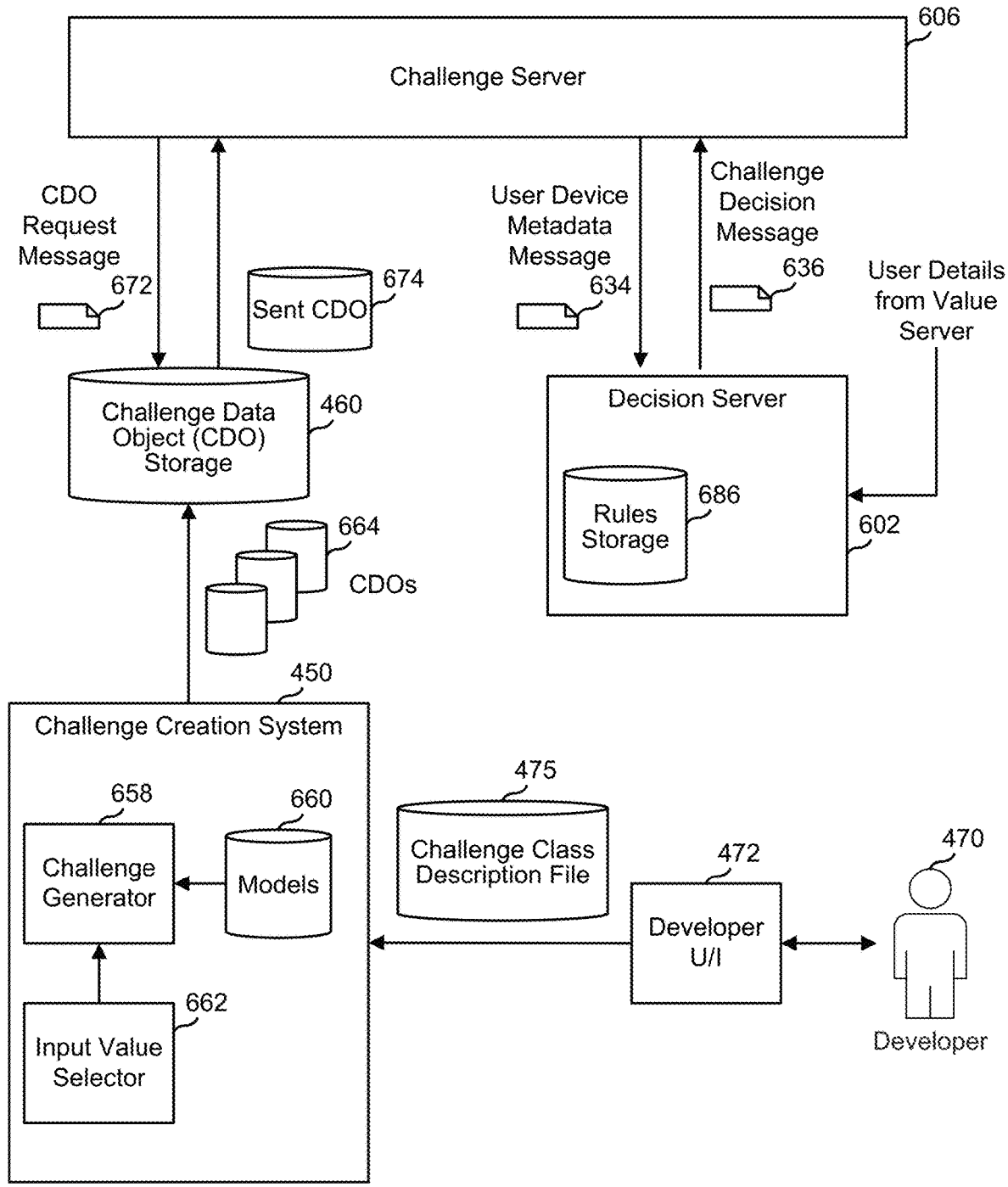
FIG. 6 illustrates internal operations of an authentication challenge system in greater detail, in an embodiment of the present disclosure, considering FIGS. 4-5 in context.

FIG. 6 illustrates internal operations of an authentication challenge system in greater detail, in an embodiment, considering FIGS. 4-5 in context. As shown there, a developer 470 may use a developer user interface 472 to generate a challenge class description file 475 and provide that to a challenge creation system 450, which may comprise a challenge generator 658 that receives input value selections from an input value selector 662 and models from a model store 660. With this approach, challenge creation system 450 can generate a large number of CDOs 664 from challenge class description file 475 and those can be stored into a CDO storage 460.

A challenge server 606 may send a CDO request message 672 to CDO storage 460, perhaps in response to a user's challenge request. CDO storage 460 may reply to challenge server 606 with a CDO 674. Challenge server 606 may send a user device metadata message 634 to a decision server 602 and get back a challenge decision message 636 indicating whether a user should be challenged. A decision by decision server 602 may be based on rules stored in a rules storage 686, which may be rules as described herein elsewhere, and/or based on user data from a value server and/or an authentication controller.

Attempts to access the protected computer resource may be made by various users. Typically, the operator of the computer resource may want to allow legitimate users to access the computer resource, while blocking bypassers (users who may be attempting to access the computer resource in ways undesired or unintended by the operator, such as being employed to bypass legitimate controls, and/or masquerade as genuinely interested customers) and automated users, such as bots (automated processes that may be attempting to access the computer resource in ways undesired or unintended by the operator). In such cases, the operator may set up the computer resource on a value server and have access to that value server controlled by an authentication access system of an authentication challenge system.

An authentication access system may serve as a gatekeeper to a computer resource protected by the authentication challenge system and/or may provide a recommendation or result to another system that controls the computer resource. Thus, the authentication access system may block what is determined to be an access by an unintended user and allow what is determined to be an access by a legitimate user or may just provide messaging to other systems that may result in such access controls.

Protection of computer resources may comprise giving legitimate users easy access the computer resource while blocking unintended users (e.g., bypassers and bots) or at least making access more difficult for unintended users. The computer resource may be a server providing content (e.g., a web server serving web pages), an e-commerce server, an advertising-supported resource, a polling server, an authentication server, or other computer resource. The computer resource may be data, communications channels, computing processor time, etc. In part, a role of the authentication challenge system is to try and determine what kind of user is attempting an access and selectively put up roadblocks or impediments for unintended users.

A value server may provide computer resources, or access thereto, to a user having a user device. The user device may be a computer device the user uses to connect to the value server. The value server can issue to the user device a demand for the user to successfully complete a challenge before the value server issues to the user the service of value. In some embodiments, the value server sends the user device a message indicating that the user device should contact an authentication challenge system, obtain an access token (which the authentication challenge system would presumably only supply if it deemed the user successful in a challenge), and provide the access token to the value server in order to access desired assets.

The nature of the user device may not be apparent to the value server or other components of the authentication challenge system, but those components may be configured as if the user device is a user device that can be operated by an automated process or by a human process. For example, responses to challenges may be received that could have been generated by an automated process or by a human.

A decision server determines whether a user system is to be challenged and, if so, what class, level, and/or type of challenge to use. The decision server may respond to a request from a value server or a request from a user system, perhaps where the user system is sending the request to the decision server at the prompting of the value server. The value server may send the decision server a set of user properties that may be known to the value server but not necessarily knowable by the decision server. Examples may include a user's history of activity with the value server, transactions the user made on the value server, etc. For example, the value server may indicate to the decision server that certain users are suspicious based on past interactions with the value server and the decision server may use this information to lean towards issuing a challenge, whereas in the value server indicates that a user has behaved normally in the past and is a regular, known user, the decision server may use this information to lean away from issuing a challenge. The decision server can evaluate the user details that the value server provides, along with its own information, and compute a decision. The decision server may also have access to other data about the user or user's device, such as past history from other sources, user properties, a device fingerprint of the user's device, etc. The decision server may determine that the user's device had attempted to automatically solve previous challenges, and therefore decide to issue a challenge that is especially hard to automate. The decision server may decide that no challenge is necessary, that some challenge is necessary, and if necessary, what class, level, and/or type of challenge is warranted. The decision server may store the user properties and details of a present decision, which can be used for making future challenge decisions.

In some embodiments, instead of the value server passing data about the user directly to the decision server, the value server may pass the data via the user device, perhaps in an encrypted form, with the user device forwarding that data to the decision server. If the decision server can decrypt it, but the user device cannot, that allows for secure transmission of that data from the value server to the decision server. Presumably, that would make it difficult for the user device to create a false set of data. In some embodiments where the data passes through the user device, the user device may be directed to pass data back to the decision server if the user device is to obtain access to the value server. In some embodiments, the value server and the decision server may communicate directly. There are various ways the decision server could be alerted to some bypass attempts, in which case the decision server may determine that it is to issue a new challenge, perhaps under the suspicion that the user device has tampered with the data.

The decision server can send a decision message indicating the decision and details to the value server and/or the user device. In the latter case, the decision message may include an identifier that the user device can pass on to the value server. In an embodiment, a value server instructs the user device to make a request to the decision server, the user device makes the request of the decision server, the decision server decides not to issue a challenge and provides the user device with a token that the value server will accept for providing access to the controlled asset, or the decision server decides to issue a challenge and after the user device successfully meets the challenge, a component of the authentication challenge system (the decision server or other component) provides the user device with the token that the value server will accept for providing access to the controlled asset.

A response processor receives challenge details of a challenge and a user response to a challenge and determines whether the challenge is met. In some embodiments, the challenge is deemed met if the user device provides an answer to a challenge query that matches a pre-stored answer to that challenge. The response processor may receive a challenge evaluation data object from another component, where the challenge evaluation data object may include details of the challenge and the user response and reply with a binary answer to whether the response is deemed correct. The reply of the response processor may be to the decision server, which can then store information for future challenges, may be to the user device with a token that the value server would accept, or other options that convey results of a user response evaluation. In some instances, the response processor may provide a reply that is inconsistent with what actually occurred, such as deeming that an automated process is actually a human or that a human authorized user is actually an unauthorized user. However, with a well-designed response processor and other components, such incidents may be infrequent. In some instances, the response processor may initially deem a response to be correct enough to allow for access but may indicate that the user is questionable and that may trigger the decision server to issue additional challenges. This may be useful in the case where a human repetitively attempting access can get the response correct, but still be judged as undesired, and therefore get flagged for more challenges that spend more time in order to render those activities less profitable. In some cases, the response may be correct, but have indicia of automation, such as a response being so quick that it may be from an automated source. In this manner, the decision server can take various factors into account to determine whether to issue a challenge, while the response processor simply outputs a binary decision to allow access or block access. In other variations, the response processor can output a decision that has more than two possibilities. In a specific example, the response processor has three possible responses to a received challenge evaluation data object: "allow the user access to the value server," "deny the user access to the value server," and "issue another challenge."

A challenge server may output and manage challenges, perhaps in the form of challenge data objects. The challenge server may send a challenge data object to a decision server and/or to a user device directly. A challenge data object may have elements that are known to the authentication challenge system but are not conveyed to the user device, such as details used to construct the challenge represented in the challenge data object that may be stored as a set of pre-determined human expectations generated based on a model used to construct the challenge.

A challenge processor, perhaps part of the decision server and/or the response processor, can evaluate details, metadata, etc. of a user response, and assess future risks of interactions with that user, which can then be forwarded to the decision server to help with future decisions about whether to challenge the user.

An authentication access system may be used to control access to the value server, such as in cases where the value server is not configured to request and evaluate tokens from users or user interactions. In such cases, the authentication access system can handle those tasks and interact with the decision server, the response processor, and/or the challenge processor. In a specific implementation, user devices and user computer systems of those user devices can only access the value server via the authentication access system and the value server allows for access from any system that the authentication access system allows through. The authentication access system can then be the gatekeeper of the value server.

Figure 7:
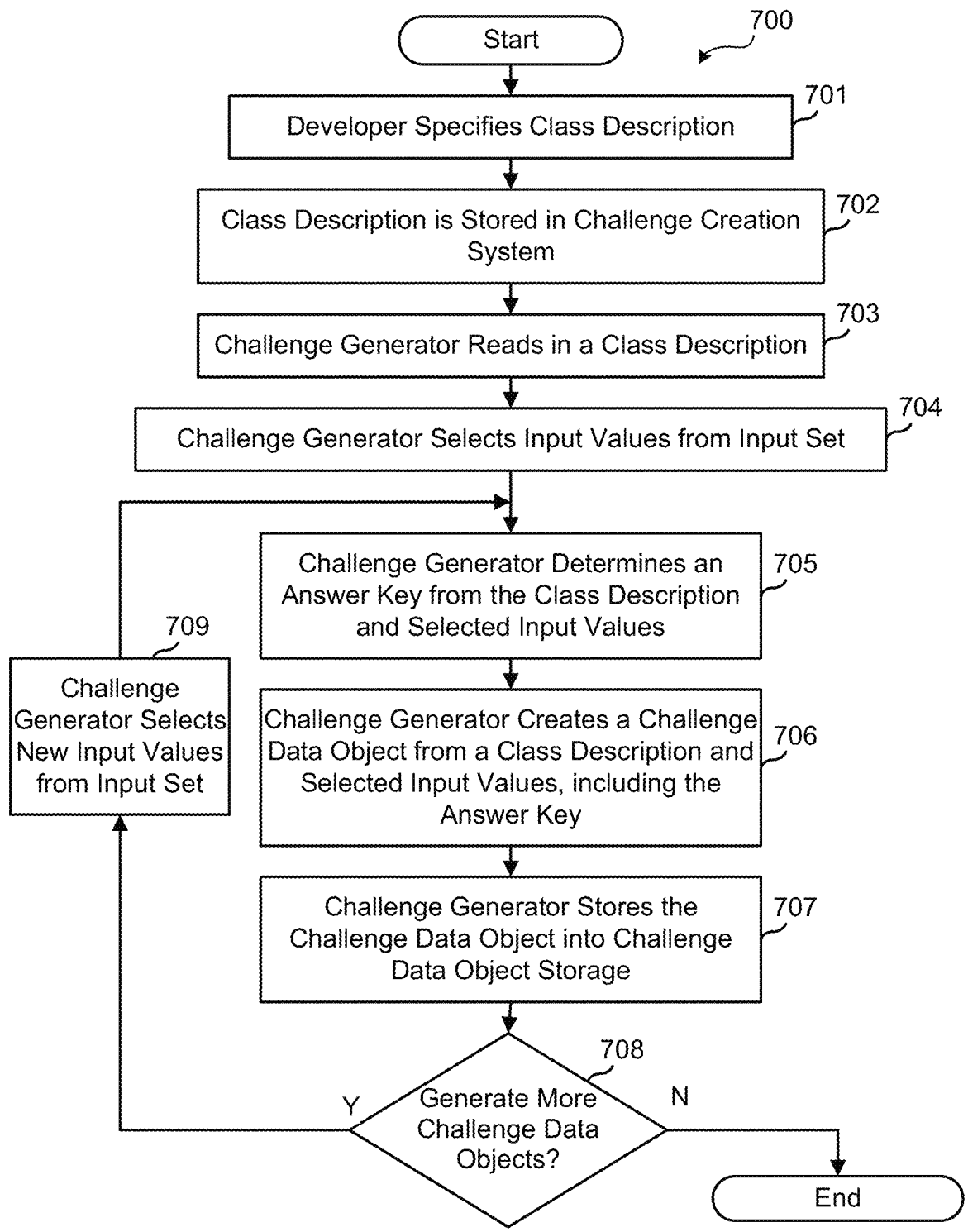
FIG. 7 is a flow diagram of a method of creating a class of authentication challenges, in accordance with some embodiments of the present disclosure.

FIG. 7 is a flow diagram of a method 700 of creating a class of authentication challenges, in accordance with some embodiments of the present disclosure. Method 700 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, at least a portion of the method 700 may be performed by a computing device (e.g., the challenge creation system 450 of at least FIGS. 4 and 6).

With reference to FIG. 7, method 700 illustrates example functions used by various embodiments. Although specific function blocks ("blocks") are disclosed in method 700, such blocks are examples. That is, embodiments are well suited to performing various other blocks or variations of the blocks recited in method 700. It is appreciated that the blocks in method 700 may be performed in an order different than presented, and that not all of the blocks in method 700 may be performed.

Referring to FIG. 7, in method 700, at operation 701, a developer may specify a class description. At operation 702, a class description (e.g., for multiple different sound recordings) is stored in a challenge creation system. At operation 703, a challenge generator selects two or more of different types of sounds of a class description to generate a playback sequence. At operation 704, the challenge generator selects input values from an input set. At operation 705, the challenge generator determines an answer key from the class description and the selected input values. At operation 706, the challenge generator creates a challenge data object (CDO) from the playback sequence and selected input values, including the answer key. At operation 707, the challenge generator stores the CDO into a CDO storage. At operation 708, the challenge generator determines whether to generate more CDOs. If so, at operation 709, the challenge generator selects new input values from an input set and loops back to operation 705. If not, the process terminates or proceeds to another class description.

In an embodiment, the two or more different types of sounds may include sounds made by different instruments. For example, a CDO may include a playback of symphony excerpt and an associated multiple-choice question is presented to a user asking for a selection of two or more sounds of instruments used in the symphony excerpt. In an embodiment, the two or more different types of sounds may include sounds of different human languages and an associated multiple-choice question may present answers for different languages (a subset of the answers correctly correspond to the different languages used in the playback). In an embodiment, the two or more different types of sounds may include sounds made by different animals (e.g., birds, cats, dogs, etc.), or made by the same animal in different situations (e.g., defensive, offensive, etc.). In some embodiments, a combination of different types of sounds may be presented in a common playback duration, such as to increase the difficulty against non-human operators.

In the associated multiple-choice question, a subset or all of the corresponding descriptions of sounds played may be required from a user input to pass the challenge. The requirement may depend on the desired security or difficulty level. For example, to generate a low difficulty challenge, multiple types of sounds may be played separately at different points of time during the playback at similar volumes. To generate a high difficulty challenge, multiple types of sounds may be mixed (e.g., played simultaneously or overlapped to generate interference) at different volumes (e.g., foreground vs. background sounds). Accordingly, the answer choices may correspond to more recognizable sounds to lower the difficulty level, or less recognizable sounds to increase the difficulty level. Thus, in some embodiments, the CDO data that the user device receives may not have a uniform level of difficulty (e.g., random generation of challenges) and that may be left to the user to discern, as needed, making automated processing harder.

Figure 8A:
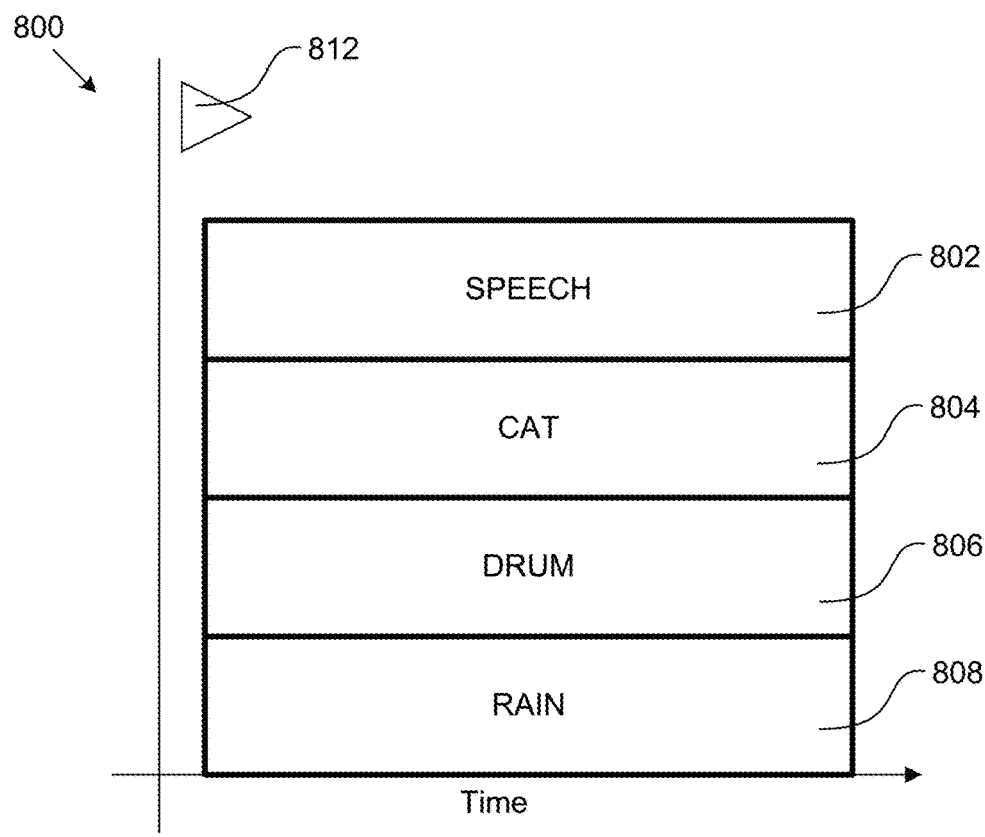
FIG. 8A illustrates an example challenge sound clip to be played for verifying a user, according to some embodiments of the present disclosure.

FIG. 8A illustrates an example challenge audio clip 800 to be played for verifying a user, according to some embodiments of the present disclosure. The audio clip 800 may be played (e.g., by actuating a playback button 812) at a playback device, such as speakers in connection to the user's computing device. As shown, the example challenge audio clip 800 includes four different types of sounds: a first sound 802 (e.g., a sound of speech), a second sound 804 (e.g., a sound of a cat), a third sound 806 (e.g., a sound of a drum), and a fourth sound 808 (e.g., a sound of rain). The different types of sounds 802, 804, 806, 808 may be aligned along a time axis such that when the audio clip 800 is played, the four sound types are played, at least in part, simultaneously and/or concurrently. A human may be capable of distinguishing each of the four types of sounds and matching the distinguished sounds with a description, while a machine or a program may be confused by the overlaying structure. Although the four different types of sounds are illustrated to occur simultaneously, in some cases, the different types of sounds may partially overlap, or may be distinct from each other (depending on certain difficulty levels as desired). For example, in some embodiments, a volume of the second sound 804 (e.g., the cat sound) within the audio clip 800 may be higher than a volume of the first sound 802 (e.g., the speech sound) of the audio clip 800. The examples of the first, second, third, and fourth sounds 802, 804, 806, 808 are merely examples, and other sounds may be used as part of the audio clip 800 without deviating from the embodiments of the present disclosure.

In some embodiments, one or more of the first, second, third, and fourth sounds 802, 804, 806, 808 may be distorted and/or modified from a naturally occurring version of the same sound. For example, the second sounds 804 (e.g., the cat sound) may be modified from a naturally-occurring cat sound, such as by increasing a frequency of the sound, changing a speed of the sound, or the like. Thus, while one of the first, second, third, and fourth sounds 802, 804, 806, 808 may be recognizable by a human, a machine learning algorithm may have difficult categorizing the sound without extensive training.

Figure 8B:
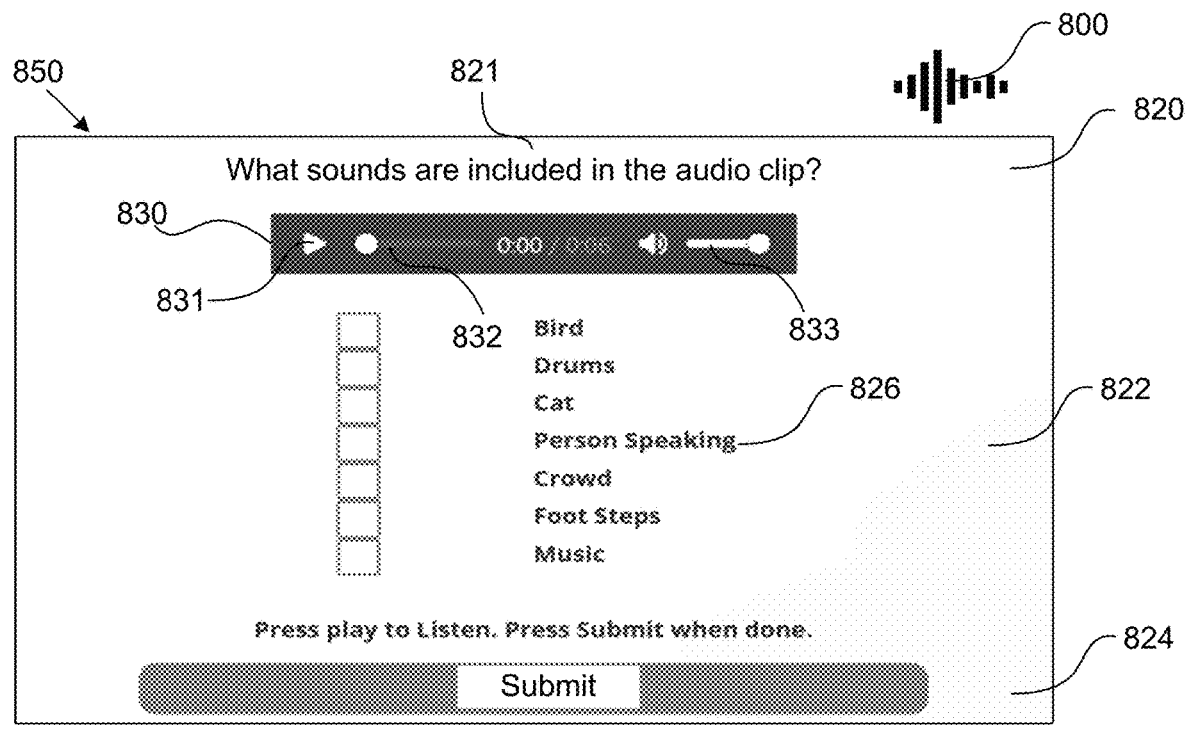
FIG. 8B illustrates and example of a challenge user interface according to some embodiments of the present disclosure.

FIG. 8B illustrates an example of a challenge user interface 850 according to some embodiments of the present disclosure. Referring to FIG. 8B, the challenge user interface 850 may include a challenge request area 820, a playback control area 830, a multiple-choice answer area 822, and a response submission area 824.

As shown, the challenge request area 820 prompts a user to listen for certain sounds that may be included in the audio clip 800 to be played. The challenge request area 820 may include a challenge text 821. The challenge text 821 may include a stem that identifies the question associated with an audio clip (such as audio clip 800 of FIG. 8A). The challenge request area 820 may include instructions and/or explanations for completing the challenge verification.

The playback control area 830 may include a playback/pause button 831, a progression indicator 832, and volume control 833. Selection of the playback/pause button 831 may initiate play of the audio clip 800. For example, if the user presses the playback/pause button 831, the audio clip 800 may be played on a speaker of the user's computer device. In some embodiments, pressing the playback/pause button 831 while the audio clip 800 is playing may pause play of the audio clip 800. The progression indicator 832 may indicate a progress of the audio clip 800 (e.g., as the audio clip 800 plays). In some embodiments, the progress indicator 832 may be a user control, and movement of the progress indicator 832 may change a position at which the audio clip 800 is playing. The volume control 833 may control a loudness of the playing of the audio clip 800. In some embodiments, the volume control 833 may control the volume of the entire audio clip 800, but not necessarily selectively control a volume of individual sounds that make up the audio clip 800.

The multiple-choice answer area 822 may include a set of alternatives or possible answers 826 or responses to the challenge text 821. In some embodiments, the challenge text 821 may have multiple answers 826 within the multiple-choice answer area 822 that are correct. For example, as illustrated in FIG. 8A, an audio clip 800 may include portions of audio associated with speech, a cat, a drum, and rain. In the example of FIG. 8B, the multiple choice answer area 822 provides potential answers 826 as "bird," "drums," "cat," "person speaking," "crowd," "foot steps," and "music." The multiple-choice answer area 822 may include multiple checkboxes or other user input elements for the user to select answers 826 corresponding sounds included in the audio clip 800.

In some cases, depending on an intended difficulty level, not all sounds included in the audio clip 800 have a corresponding answer choice 826 in the multiple-choice answer area 822. The multiple-choice answer area 822 may include at least one incorrect or interfering answer choice 826 to decrease the accuracy rate of random answer selections. For example, multiple wrong answer choices 826 may be intentionally provided in the selectable answers 826 to avoid a correct selection by chance. For example, the challenge user interface 850 includes "crowd," "foot steps," and "music" as answers 826 which are not included as sounds in the audio clip 800. In some embodiments, such wrong answer choices 826 may also be related to one or more correct answer choices to interfere with any machine-learning-trained selection. For example, a "person speaking" and a "crowd" may be related, but a user may be able to determine the differences in such sounds when included in audio clip 800.

In some embodiments, instead of, or in addition to, the checkboxes, the user's response to the challenge text 821 may be recorded (e.g., by providing a recording button to the user in the interface). For example, audio of the user speaking one or more of the multiple choice answers 826 of the multiple-choice answer area 822 may be recorded by a microphone of the user's computer. The user's recorded response may be processed and analyzed in a similar manner as the selection responses described below. A playback control for the user's response recording may also be provided (similar to, but separate from the playback control area 830).

Figure 8C:
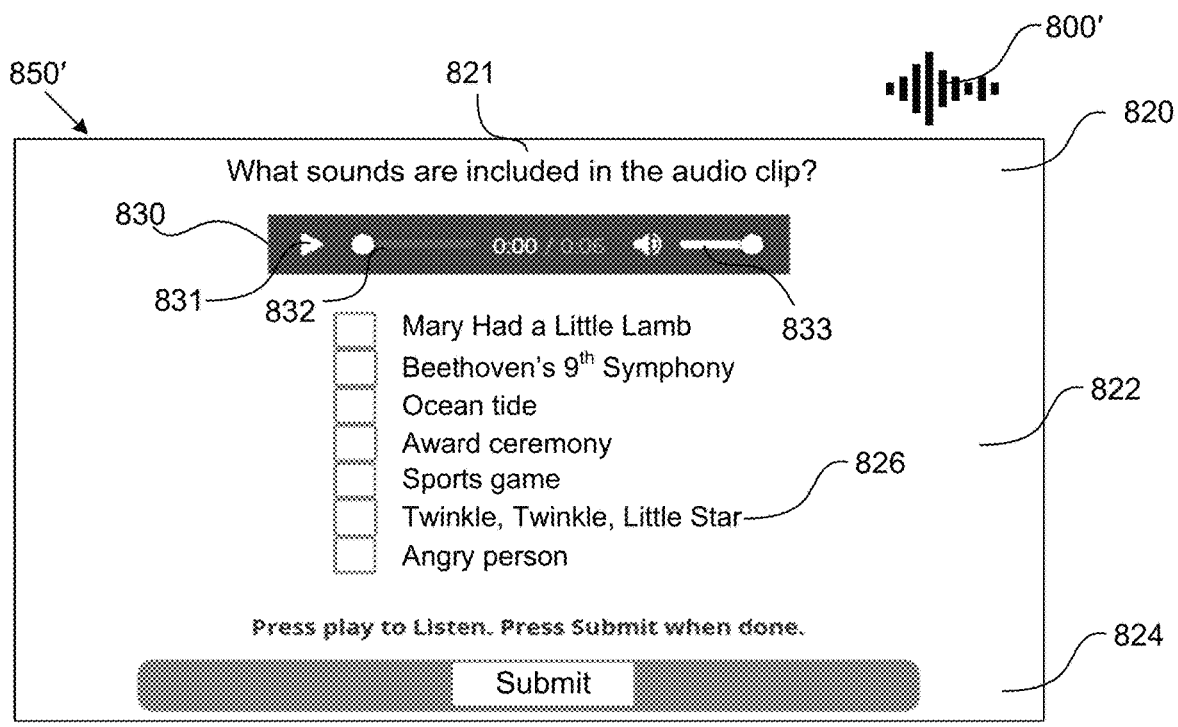
FIG. 8C illustrates an example of a challenge user interface according to some embodiments of the present disclosure.

FIG. 8C illustrates an example of a challenge user interface 850' according to some embodiments of the present disclosure. In some embodiments, the multiple-choice answer area 822 may include answer choices 826 designed to confuse machine recognition algorithms, such as by employing multiple meanings of a common textual description, or referring to names or references only a human would recognize (e.g., composer names, movie themes or titles, etc.). In some embodiments, the answers 826 of the multiple-choice answer area 822 may include answer choices 826 of descriptive correspondence to the two or more different types of sounds of an audio clip 800'.

As illustrated in FIG. 8C, in some embodiments, the answers 826 of the multiple-choice answer area 822 may include at least one of names of known compositions, literature, songs, surroundings, environment, nature, events, or emotions. For example, the multiple-choice answer area 822 may include answers 826 of "Mary had a Little Lamb," "Beethoven's $9^{th}$ Symphony," ocean tide, award ceremony, sports game, "Twinkle, Twinkle, Little Star," "angry person," etc.

An audio clip 800' may include sounds, either singly or concurrently, that match one or more of the answers 826 of the multiple-choice answer area 822. For example, the audio clip 800' may include excerpts of music that a human would be able to identify as one or more of "Mary had a Little Lamb," "Beethoven's $9^{th}$ Symphony," and/or "Twinkle, Twinkle, Little Star," as well as other commonly-known titles. As another example, audio clip 800' may include sounds of an event with audio clues that would allow a human to identify the environment and/or context of the audio. For example, the audio clip 800' may include sounds of people talking with spoken words (e.g., "trophy" and/or "winner") and/or other sounds (e.g., applause) that would identify the context as an award ceremony. Similarly, the audio clip 800' may include sounds (e.g., cheers, balls bouncing, etc.) that would identify the context as a sports game. In some embodiments, the audio clip 800' may include sounds of that provide a context to an emotion that may be used as one of the answers of the multiple-choice answer area 822. For example, the audio clip 800' may include speech with words and/or tone of voice that would allow a human to identify an emotion of the speaker (e.g., happy, sad, angry, tired, etc.)

Figure 8D:
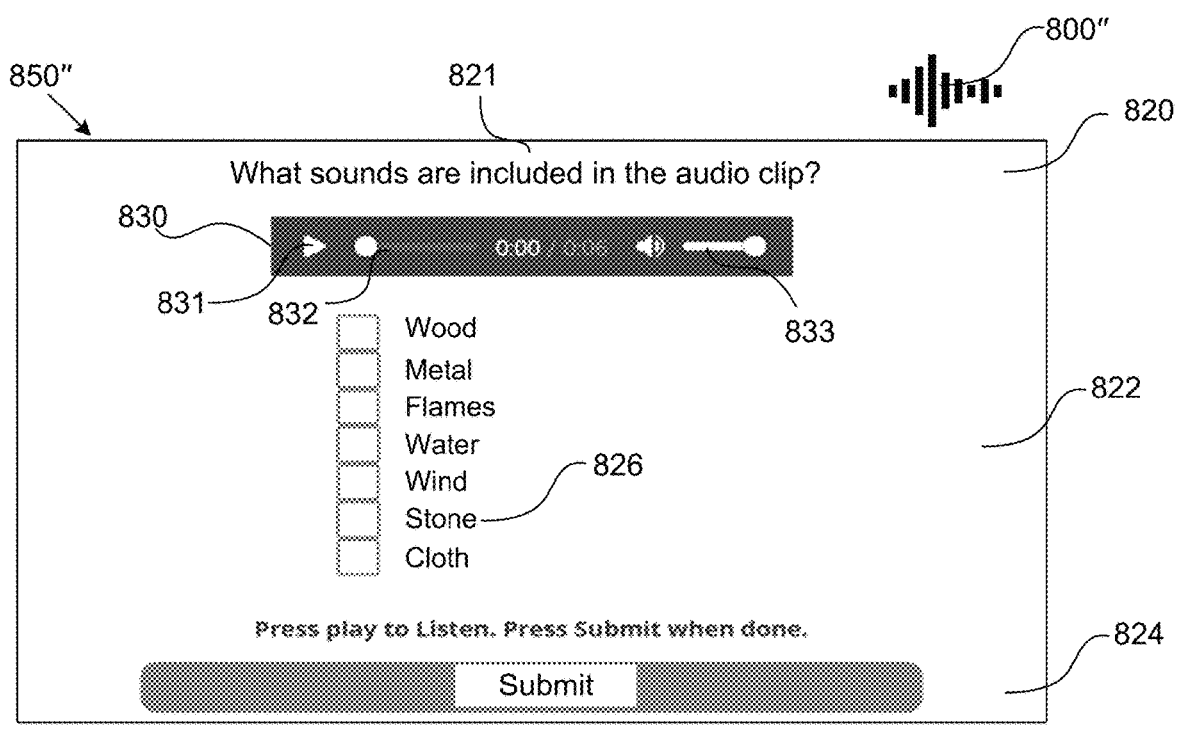
FIG. 8D illustrates an example of a challenge user interface according to some embodiments of the present disclosure.

FIG. 8D illustrates an example of a challenge user interface 850" according to some embodiments of the present disclosure. As with the example of FIG. 8C, the answers 826 within the multiple-choice answer area 822 of the challenge user interface 850" may include answer choices 826 of descriptive correspondence to the two or more different types of sounds of an audio clip 800".

As illustrated in FIG. 8C, in some embodiments, sounds of the audio clip 800" may include sounds associated with particular materials, such as metal, wood, water, flames, water, wind, stone, cloth, etc. For example, an answer 826 of the multiple-choice answer area 822 of "metal" may be associated with a sound of an object, such as a hammer, striking metal. An answer 826 of "wood" may be associated with a sound of an object, such as an axe, striking wood. An answer 826 of "water" may be associating with a splashing of an object entering water. An answer 826 of "flames" may be associated with a sound of a fire. Other examples of materials or types of sounds within the audio clip 800, 800', 800" are possible without deviating from the embodiments of the present disclosure.

Referring to FIGS. 8A to 8D, when the user completes making the selection of the answers 826 from the multiple-choice answer area 822 that represent the sounds in the sound clip 800, 800', 800" (e.g., using the challenge user interface 850, 850', 850" and/or by submitting a recorded response), the user may submit the response (e.g., using the submit button in the response submission area 824).

Figure 9:
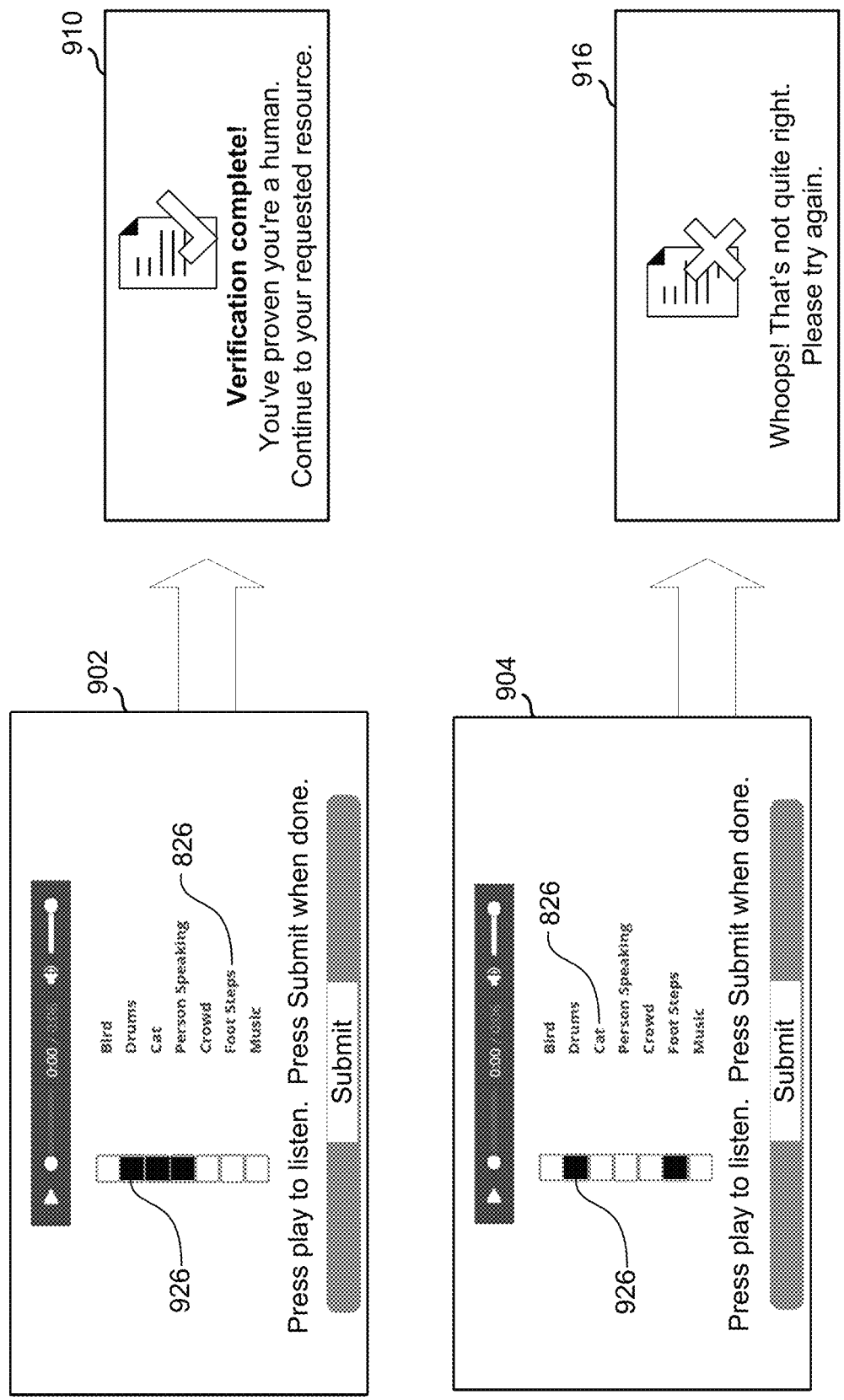
FIG. 9 depicts an example of an operation of checking user responses, according to an embodiment of the present disclosure.

FIG. 9 depicts an example of an operation of checking user responses, according to an embodiment of the present disclosure. A description of elements of FIG. 9 that have been previously described will be omitted for brevity. A challenge creation system may be used to create challenges that are to be presented to users. The challenge creation system may include a sound editing system that performs tasks that enable a challenge creator to create, manipulate, and compile sounds into an audio clip (e.g., audio clip 800, 800', 800" described herein) to be used in creating the challenges. A challenge may be stored electronically as a data object having structure, such as program code, sound recordings, parameters for their use, etc. The challenge server may be provided a set of these data structures and serve them up as requested.

In the illustration of FIG. 9, a challenge presentation may be in the form of sound recognition of sounds of an audio clip 800, 800', 800", according to an embodiment of the present disclosure. A user, after playing the provided sound clip (e.g., by pressing the play button after being prompted the request to answer the challenge text), may select two or more selected answer choices 926 corresponding to the two or more sounds included in the playback. For example, the selected answers 926 may be made by checking a checkbox next to an answer choice, or performing other user interface actions with regard to an answer 826. When the user presses the submit button, the selection of answer choices may be submitted to the challenge server. The challenge server can determine whether the user selection corresponds to some or all of the correct sounds included in the playback recording.

For example, referring to the example audio clip 800 of FIGS. 8A and 8B, an audio clip 800 may include sounds of speech, a cat, a drum, and/or rain. Of the answers 826 in the multiple-choice answer area, a correct response may include a selection 926 of one or more of "drum", "cat", and "person speaking." A response to the correct selection 926 of answer choices 826, as illustrated in user interface display 902, may include the success message 910 as illustrated, or accompanied by (or replaced by) a confirmation sound.

On the other hand, if the user input into the multiple-choice answer area fails to correctly select 926 answers 826 corresponding to the two or more sounds (or a subset thereof) included in the playback, the user selection 926 submitted to the challenge server will not match the answer key, as illustrated in user interface display 904. As a result, the user may receive a fail message 916.

In some embodiments, a correct answer may allow for partial correct selections 926, such as on a number of correct matches and not requiring all correct matches. For example, when the audio challenge includes four different sounds (and corresponding four correct answers), the challenge may accept correct responses to three of the four. In some embodiments, the user may be allowed to try again (e.g., given certain attempt counts, and/or a cool-down time period between attempts against automation). If the user is allowed to try again, the user may be presented with a different challenge presentation corresponding with a different challenge data object (e.g., different combination of sounds, different object types, including visual challenges, etc.).

Figure 10:
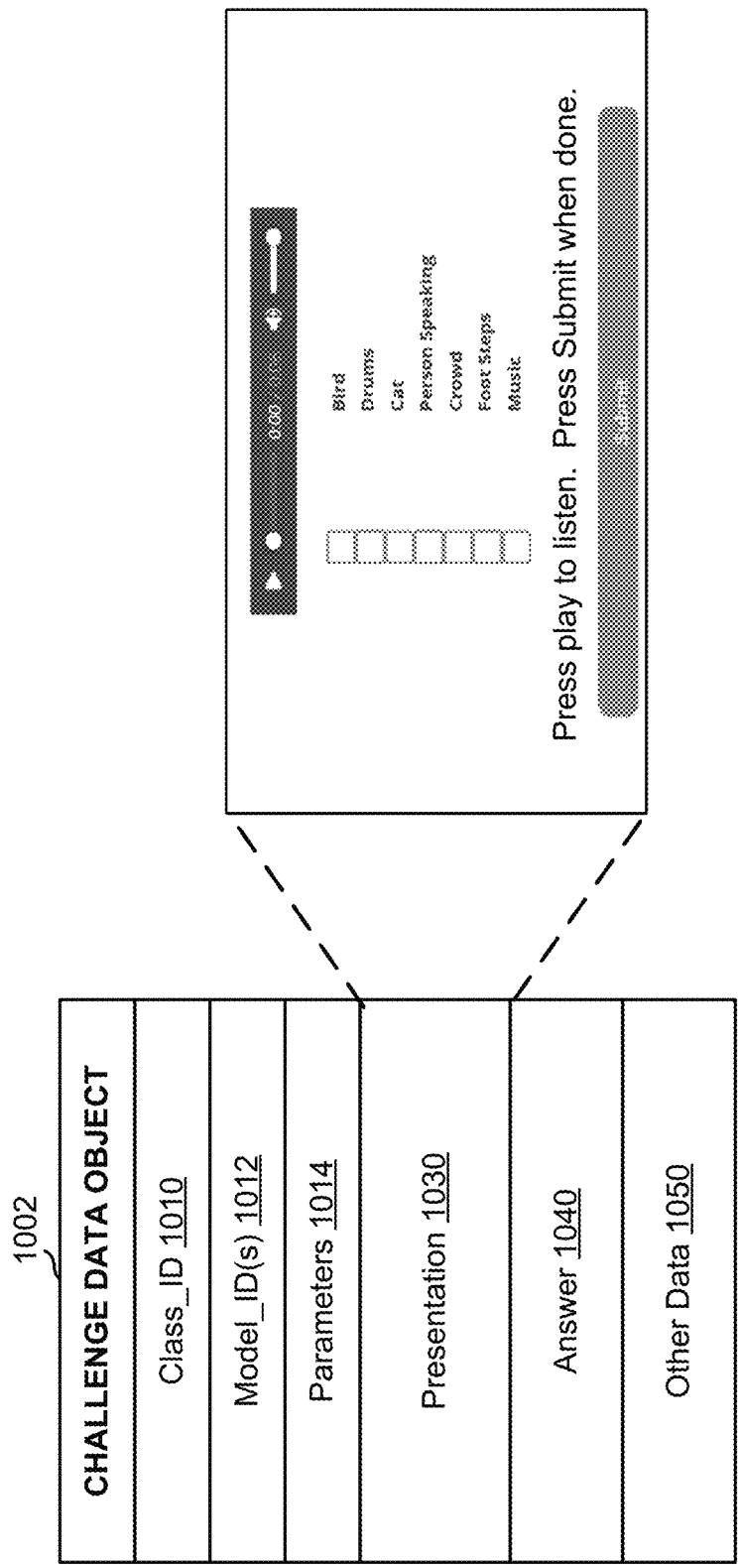
FIG. 10 illustrates an example of a challenge data object, showing a sound challenge that may be presented to a user device, data fields indicating criteria to be applied to the challenge, and other data, according to an embodiment of the present disclosure.

FIG. 10 illustrates an example of a challenge data object 1002, showing a sound challenge that may be presented to a user device, data fields indicating criteria to be applied to the sound challenge, and other data, according to some embodiments of the present disclosure. In some embodiments, the criterion is in the form of a question. A description of elements of FIG. 10 that have been previously described will be omitted for brevity. The components of the challenge data object 1002 illustrated in FIG. 10 are merely an example, and, in some embodiments, fewer, more, or different components may be present without deviating from the embodiments of the present disclosure. The challenge data object 1002 may be similar to the CDO 222, 322, and 522 described herein.

The challenge data object 1002 may comprise sounds, properties associated with each sound, and the criterion associated with each sound. The challenge data object 1002 can include the criterion, at least one sound associated with the property of being a correct answer to the criterion, and at least one sound associated with the property of being an incorrect answer to the criterion. The challenge server can associate each sound with a unique sound ID. The challenge server can store each sound ID, associated with the list of properties of the sound (e.g., instrument, language, animal, gender, frequency, magnitude, nature, pattern, noise, etc.), as an answer key for the challenge data object 1002, which references which responses are associated with sounds that satisfy the criterion and therefore are correct, and which responses are associated with sounds that do not satisfy the criterion and therefore are incorrect. The challenge server may assemble the challenge data object. The challenge server may send to the user device the challenge, or part thereof, omitting the answer key and possibly other elements.

In some embodiments, the challenge data object 1002 is generated by a computer from a source, such as a sound model or other data. The sounds and the possible input values of frequency and magnitude may be specified by the challenge creator and used by the modelling system to create specific challenge presentations to be presented to users (e.g., as a user challenge interface 850, 850', 850", as described herein). In some embodiments, a sound editing system can generate a challenge presentation by randomly selecting a sound clip from the sound store, and selecting a set of sound alterations to be applied to the sound clip. For example, a challenge type may be selected randomly from the set of challenge types specified by the challenge designer, where the challenge type specifies a particular combination of different types of sounds (e.g., to form an audio clip, such audio clip 800, 800', 800", as described herein).

The challenge data object 1002 may include a class ID 1010 that describes the type of challenge and how the challenge is to be processed. For example, the class ID 1010 may indicate that the nature of the challenge is to select one or more provided answers based on sounds present in an audio clip, as described herein with respect to FIGS. 8A to 8D.

The challenge data object 1002 may also include one or more model ID(s) 1012 that specifies one or more models used to generate the challenge presentation. For example, the one or more model ID(s) 1012 may include an audio clip 800, 800', 800" and/or one or more sounds, as described herein, that may be utilized for the challenge. The model ID(s) 1012 may also include, in some embodiments, sound IDs for each of the sounds of the audio clip 800, 800', 800" used in the challenge.

The challenge data object 1002 may also include a parameters description 1014 that describes aspects of the challenge, such as the ordering of the sounds within the audio clip 800, 800', 800" and/or alterations to respective ones of the sounds. In some embodiments, the parameters 1014 may include properties of the sounds of the challenge (e.g., instrument, language, animal, gender, frequency, magnitude, nature, pattern, noise, etc.) In some embodiments, the parameters describing the challenge are not conveyed to the user device, and the sounds are combined to form an audio clip 800, 800', 800" and sent to the user device after being constructed by the challenge server.

The challenge data object 1002 may also include presentation data 1030 that describes aspects or additional details for how the challenge is presented (e.g., as a user challenge interface 850, 850', 850", as described herein). In some embodiments, the presentation 1030 may include a criterion in the form of a question. A question may be in the form of a prompt ("Select the answers describing the sounds you hear."), may be asking about a property of what is depicted in a presentation 1030, may be about the correctness of what is depicted in a presentation, etc. The question of the criterion may, in some embodiments, be utilized to form the challenge text 821 illustrated in FIGS. 8A to 8C.

The challenge data object 1002 can also include an answer key 1040. The answer key 1040 may be a separate data field that describes the sound and/or sounds that will result in a correct solution to the challenge. The answer key 1040 may be based on the parameters describing the sounds making up the audio clip 800, 800', 800", as well as the criterion of the presentation 1030. For example, the answer key 1040 may identify which answers 826 of the multiple-choice answer area 822 correctly answer the challenge. In some embodiments, the parameters 1014 describing the properties of the sounds may be used as the answer key 1040 and a separate answer key field 1040 may be omitted. In some embodiments, the challenge data object 1002 may include other data 1050 that may be used as part of generating the challenge and/or the challenge user interface 850, 850', 850".

The challenge server may assemble the challenge data object 1002. The challenge server may send to the user device the challenge, or part thereof, omitting the answer key 1040 and possibly other elements such as the parameters 1014. Upon receipt, the user device may be configured to display to the user the criterion and the challenge user interface 850, 850', 850", which may allow for playback of the audio clip 800, 800', 800". A user may operate an interface of the user device to choose which one or more multiple choice answers satisfy the criterion by associated with the audio clip 800, 800', 800". The user device can then send the selection of the multiple choice answer to the challenge server representing the sounds selected by the user. The challenge server can compare the multiple choice answers selected by the user to the answer key 1040.

The challenge server can determine whether the user should receive the service of value (such as access to computer resources) from the value server, and whether the user should complete a new challenge. The determination may be based on whether the user chose the sounds(s) that satisfied the criterion. The challenge server can again determine whether the user should receive the value from the value server, and whether the user must complete a new challenge. If the challenge server determines that the user must complete a new challenge, the above process can be repeated. If the challenge server determines that the user should receive the value from the value server, the challenge server can send a directive to the user device that the user device request from the value server the service of value. The challenge server can store information about the challenge, the user, and the determination whether the challenge was successfully completed or not.

The user device can send to the value server a set of validation data describing the challenge and a request that the value server issue the service of value to the user device. The value server sends to the challenge server the validation data. The challenge server compares the validation data to information stored about the challenge and the user, and as a result determines whether the validation data is authentic. If the validation data is authentic, the challenge server replies to the value server that the validation data is authentic. The value server can then decide to issue the service of value to the user device. If so decided, the user receives the service of value.

The challenge server can additionally send a request to the decision server, including the data regarding the selection by the user, and the decision server can respond with a new decision. The challenge server can again determine whether the user should receive the value from the value server, and whether the user must complete a new challenge. If the challenge server determines that the user must complete a new challenge, the above process can be repeated. If the challenge server determines that the user should receive the value from the value server, the challenge server can send a directive to the user device that the user device request from the value server the service of value. The challenge server can store information about the challenge, the user, and the determination whether the challenge was successfully completed or not.

In some embodiments, the challenge creation system can create a large number of different challenges from small variations. By being able to create a large number of distinct challenges from a single class, the ratio of effort by challenge creators and users can be kept low. Ideally, the variations of the challenges are not such that a computer process can easily process any one of those to guess the correct human expectation of the challenge.

For example, a challenge creator may use a sound editing program to create one or more sound clips and give each one various sound properties, for example, instrument, pitch, frequency, magnitude, etc. A challenge creator may give each sound clip some synthesized sounds, such as electric guitar, disco equalization, echo, resonance, etc. The challenge creator can then use the sound editing program to create a challenge sound clip in which various types of sounds can be placed and manipulated. In some embodiments, the challenge creator can use the sound editing program to create synthesized sounds that overlay on top of certain types of sound clip (e.g., generating a robot-like speech).

In a specific embodiment, computer system for securing a computer resource against unauthorized access by authenticating user computer systems attempting to access the computer resource comprising: a processing device; and a non-transitory computer-readable storage medium storing executable code, the executable code when executed by the processing device causes the processing device to perform operations. The operations may include: sending a challenge data structure to a user computer system, wherein the challenge data structure provides a challenge to be presented to a user of the user computer system, wherein the challenge comprises playing, in a test period of time, two or more different types of sounds to the user and a corresponding set of multiple-choice question including at least one interfering answer other than correct answers for the two or more different types of sounds; obtaining a user response including a selection of answers to the multiple-choice question; and providing, by a processing device, access to the computer resource for the user computer system based on whether the selection of answers matches at least a portion of the correct answers for the two or more different types of sounds.

According to one embodiment, the techniques described herein are implemented by one or more generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Figure 11:
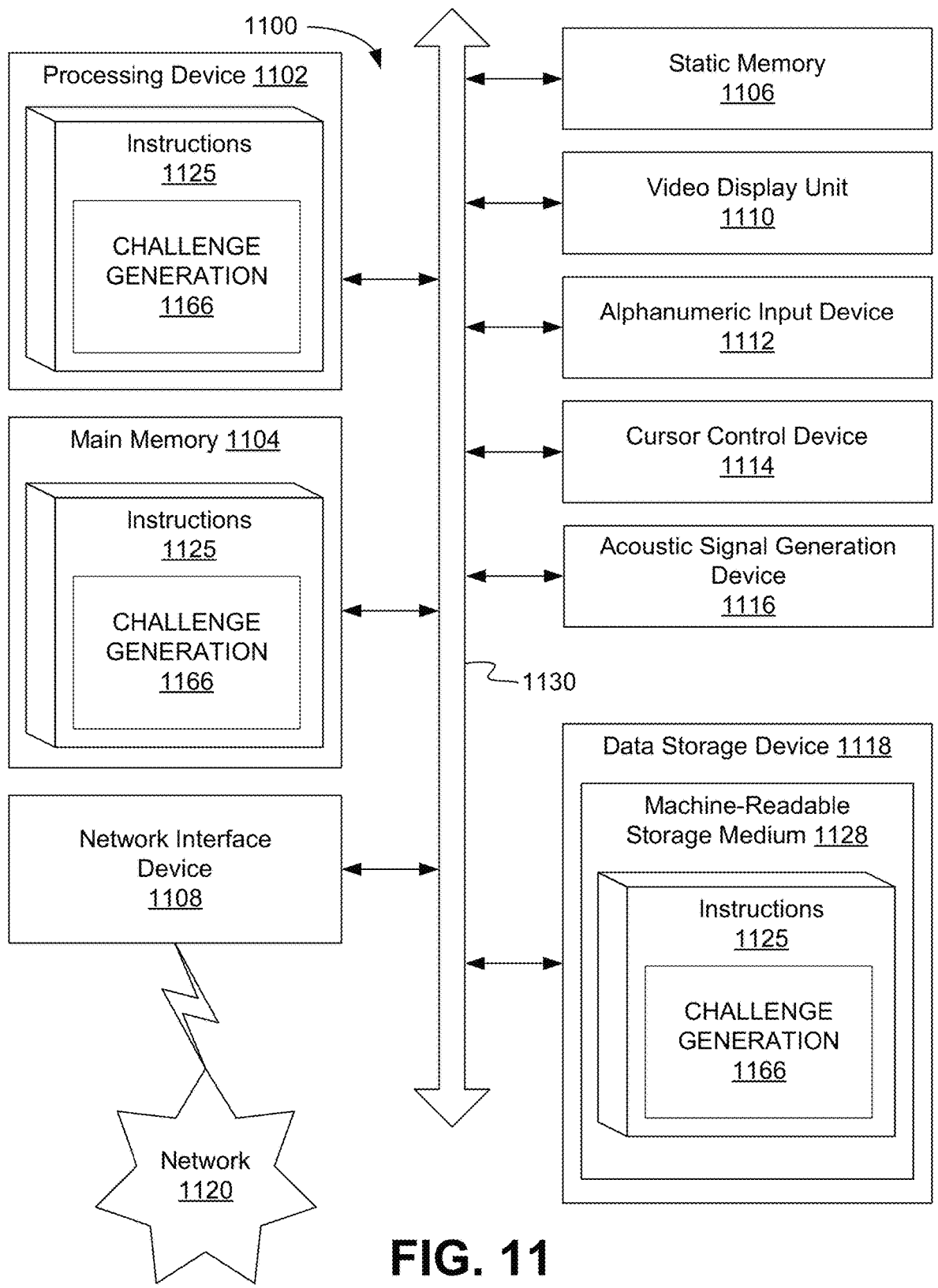
FIG. 11 is a block diagram of an example computing device that may perform one or more of the operations described herein, in accordance with some embodiments of the present disclosure.

FIG. 11 is a block diagram of an example computing device 1100 that may perform one or more of the operations described herein, in accordance with one or more aspects of the disclosure. Computing device 1100 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 1100 may include a processing device (e.g., a general purpose processor, a PLD, etc.) 1102, a main memory 1104 (e.g., synchronous dynamic random access memory (DRAM), read-only memory (ROM)), a non-volatile memory 1106 (e.g., flash memory and a data storage device 1118), which may communicate with each other via a bus 1130.

Processing device 1102 may be provided by one or more general-purpose processing devices such as a microprocessor, central processing unit, or the like. In an illustrative example, processing device 1102 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 1102 may also include one or more special-purpose processing devices such as an application specific integrated circuit (ASIC), a field programmable gate array (FPGA), a digital signal processor (DSP), network processor, or the like. The processing device 1102 may execute the operations described herein, in accordance with one or more aspects of the present disclosure, for performing the operations discussed herein.

Computing device 1100 may further include a network interface device 1108 which may communicate with a network 1120. The computing device 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse) and an acoustic signal generation device 1116 (e.g., a speaker). In one embodiment, video display unit 1110, alphanumeric input device 1112, and cursor control device 1114 may be combined into a single component or device (e.g., an LCD touch screen).

Data storage device 1118 may include a computer-readable storage medium 1128 on which may be stored one or more sets of instructions 1125 that may include instructions for a multiplier configuration component, e.g., challenge generation 1166 for carrying out the operations described herein, in accordance with one or more aspects of the present disclosure. Instructions 1125 may also reside, completely or at least partially, within main memory 1104 and/or within processing device 1102 during execution thereof by computing device 1100, main memory 1104 and processing device 1102 also constituting computer-readable media. The instructions 1125 may further be transmitted or received over a network 1120 via network interface device 1108.

While computer-readable storage medium 1128 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Figure 12:
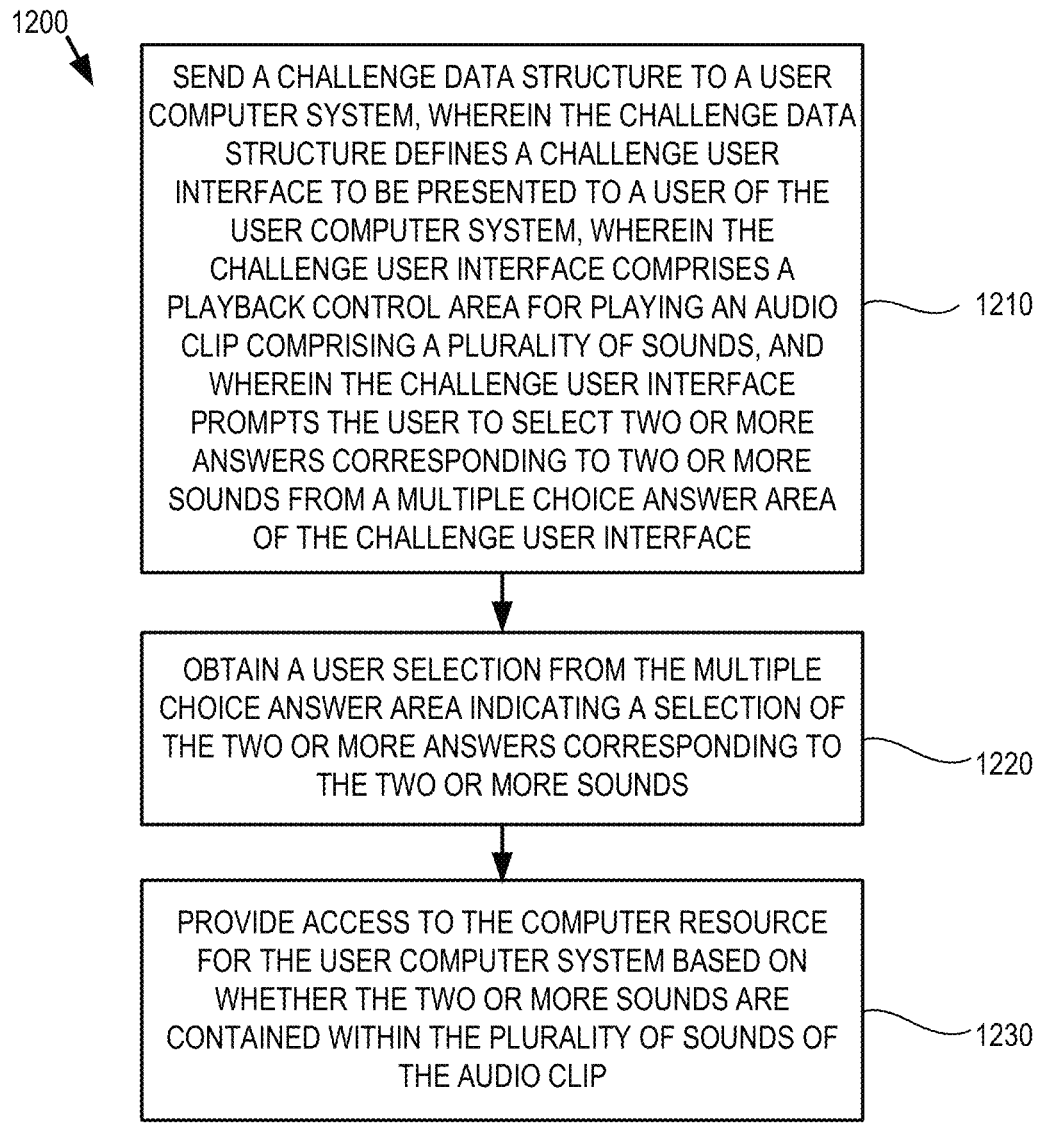
FIG. 12 is a flow diagram of a method for securing a computer resource against unauthorized access by a user computer system attempting to access the computer resource, in accordance with some embodiments of the present disclosure.

FIG. 12 is a flow diagram of a method 1200 for securing a computer resource against unauthorized access by a user computer system attempting to access the computer resource, in accordance with some embodiments of the present disclosure. Method 1200 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 1200 may be performed by a computing device (e.g., authentication challenge server 206, 306, 406, 506, 606 illustrated in FIGS. 2, 3, 4, 5, 6).

With reference to FIG. 12, method 1200 illustrates example functions used by various embodiments. Although specific function blocks ("blocks") are disclosed in method 1200, such blocks are examples. That is, embodiments are well suited to performing various other blocks or variations of the blocks recited in method 1200. It is appreciated that the blocks in method 1200 may be performed in an order different than presented, and that not all of the blocks in method 1200 may be performed.

Referring simultaneously to the prior figures as well, the method 1200 begins at block 1210, in which a challenge data structure is sent to a user computer system. The challenge data structure defines a challenge user interface to be presented to a user of the user computer system. The challenge user interface includes a playback control area for playing an audio clip comprising a plurality of sounds. The challenge user interface prompts the user to select two or more answers corresponding to two or more sounds from a multiple choice answer area of the challenge user interface. In some embodiments, the challenge user interface may correspond to the challenge user interface 850, 850', 850", as described herein with respect to FIGS. 8A to 8D. In some embodiments, the playback control area and the audio clip may correspond to the playback control area 830 and audio clip 800, 800', 800", respectively, as described herein with respect to FIGS. 8A to 8D. In some embodiments, the two or more sounds may correspond to two or more of the sounds 802, 804, 806, 808, as described herein with respect to FIG. 8A. In some embodiments, the multiple choice answer area may correspond to multiple choice answer area 822, as described herein with respect to FIGS. 8A to 8D. In some embodiments, the two or more answers may correspond to answers 826, as described herein with respect to FIGS. 8A to 8D.

In some embodiments, the multiple choice answer area includes at least one incorrect answer corresponding to an incorrect sound that is not within the plurality of sounds of the audio clip. In some embodiments, the plurality of sounds include at least one of sounds made by different instruments, sounds of different human languages, or sounds made by different animals. In some embodiments, the plurality of sounds play concurrently within the audio clip.

In some embodiments, the two or more answers corresponding to the two or more sounds from the multiple choice answer area of the challenge user interface comprise choices of descriptive correspondence to the two or more sounds, as described herein with respect to FIGS. 8C and 8D. In some embodiments, the two or more answers corresponding to the two or more sounds include at least one of names of known compositions, literature, songs, surroundings, environment, nature, events, or emotions, as described herein with respect to FIG. 8C. In some embodiments, the two or more answers corresponding to the two or more sounds are associated with materials that correspond to the two or more sounds, as described herein with respect to FIG. 8D.

At block 1220, a user selection is obtained from the multiple choice answer area indicating a selection of the two or more answers corresponding to the two or more sounds. In some embodiments, the user selection may correspond to the user selection 926, as described herein with respect to FIG. 9.

At block 1230, access is provided to a computer resource for the user computer system based on whether the two or more sounds are contained within the plurality of sounds of the audio clip. In some embodiments, the access to the computer resource may comprise data from a value server 204, 304, as described herein with respect to FIGS. 2 and 3.

Unless specifically stated otherwise, terms such as "sending," "obtaining," "providing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method operations. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the term "and/or" includes any and all combinations of one or more of the associated listed items. As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of securing a computer resource against unauthorized access by authenticating user computer systems attempting to access the computer resource, the method comprising:
   sending, by a processing device, a challenge data structure to a user computer system, wherein the challenge data structure defines a challenge user interface to be presented to a user of the user computer system, wherein the challenge user interface comprises a playback control area for playing an audio clip comprising a plurality of sounds, and wherein the challenge user interface prompts the user to select two or more answers corresponding to two or more sounds from a multiple choice answer area of the challenge user interface;
   obtaining a user selection from the multiple choice answer area indicating a selection of the two or more answers corresponding to the two or more sounds; and
   providing access to the computer resource for the user computer system based on whether the two or more sounds are contained within the plurality of sounds of the audio clip.

2. The method of claim 1, wherein the multiple choice answer area comprises at least one incorrect answer corresponding to an incorrect sound that is not within the plurality of sounds of the audio clip.

3. The method of claim 1, wherein the plurality of sounds comprise at least one of sounds made by different instruments, sounds of different human languages, or sounds made by different animals.

4. The method of claim 1, wherein the plurality of sounds play concurrently within the audio clip.

5. The method of claim 1, wherein the two or more answers corresponding to the two or more sounds from the multiple choice answer area of the challenge user interface comprise choices of descriptive correspondence to the two or more sounds.

6. The method of claim 5, wherein the two or more answers corresponding to the two or more sounds comprise at least one of names of known compositions, literature, songs, surroundings, environment, nature, events, or emotions.

7. The method of claim 5, wherein the two or more answers corresponding to the two or more sounds are associated with materials that correspond to the two or more sounds.

8. A computer system comprising:
a memory; and
a processing device, operatively coupled to the memory, to:
send a challenge data structure to a user computer system, wherein the challenge data structure defines a challenge user interface to be presented to a user of the user computer system, wherein the challenge user interface comprises a playback control area for playing an audio clip comprising a plurality of sounds, and wherein the challenge user interface prompts the user to select two or more answers corresponding to two or more sounds from a multiple choice answer area of the challenge user interface;
obtain a user selection from the multiple choice answer area indicating a selection of the two or more answers corresponding to the two or more sounds; and
provide access to a computer resource for the user computer system based on whether the two or more sounds are contained within the plurality of sounds of the audio clip.

9. The computer system of claim 8, wherein the multiple choice answer area comprises at least one incorrect answer corresponding to an incorrect sound that is not within the plurality of sounds of the audio clip.

10. The computer system of claim 8, wherein the plurality of sounds comprise at least one of sounds made by different instruments, sounds of different human languages, or sounds made by different animals.

11. The computer system of claim 8, wherein the plurality of sounds play concurrently within the audio clip.

12. The computer system of claim 8, wherein the two or more answers corresponding to the two or more sounds from the multiple choice answer area of the challenge user interface comprise choices of descriptive correspondence to the two or more sounds.

13. The computer system of claim 12, wherein the two or more answers corresponding to the two or more sounds comprise at least one of names of known compositions, literature, songs, surroundings, environment, nature, events, or emotions.

14. The computer system of claim 12, wherein the two or more answers corresponding to the two or more sounds are associated with materials that correspond to the two or more sounds.

15. A non-transitory computer-readable storage medium including instructions that, when executed by a processing device, cause the processing device to:
send, by the processing device, a challenge data structure to a user computer system, wherein the challenge data structure defines a challenge user interface to be presented to a user of the user computer system, wherein the challenge user interface comprises a playback control area for playing an audio clip comprising a plurality of sounds, and wherein the challenge user interface prompts the user to select two or more answers corresponding to two or more sounds from a multiple choice answer area of the challenge user interface;
obtain a user selection from the multiple choice answer area indicating a selection of the two or more answers corresponding to the two or more sounds; and
provide access to a computer resource for the user computer system based on whether the two or more sounds are contained within the plurality of sounds of the audio clip.

16. The non-transitory computer-readable storage medium of claim 15 wherein the multiple choice answer area comprises at least one incorrect answer corresponding to an incorrect sound that is not within the plurality of sounds of the audio clip.

17. The non-transitory computer-readable storage medium of claim 15, wherein the plurality of sounds comprise at least one of sounds made by different instruments, sounds of different human languages, or sounds made by different animals.

18. The non-transitory computer-readable storage medium of claim 15, wherein the plurality of sounds play concurrently within the audio clip.

19. The non-transitory computer-readable storage medium of claim 15, wherein the two or more answers corresponding to the two or more sounds comprise at least one of names of known compositions, literature, songs, surroundings, environment, nature, events, or emotions.

20. The non-transitory computer-readable storage medium of claim 15, wherein the two or more answers corresponding to the two or more sounds are associated with materials that correspond to the two or more sounds.

* * * * *